June 13, 1967 H. W. ATTEBERY 3,324,640

MOBILE FARM IMPLEMENT WITH COTTON HANDLING ATTACHMENTS

Filed Aug. 26, 1963

14 Sheets-Sheet 1

INVENTOR.

Henry W. Attebery

June 13, 1967 H. W. ATTEBERY 3,324,640

MOBILE FARM IMPLEMENT WITH COTTON HANDLING ATTACHMENTS

Filed Aug. 26, 1963 14 Sheets-Sheet 2

INVENTOR.
Henry W. Attebery

June 13, 1967 H. W. ATTEBERY 3,324,640

MOBILE FARM IMPLEMENT WITH COTTON HANDLING ATTACHMENTS

Filed Aug. 26, 1963 14 Sheets-Sheet 3

INVENTOR.

Henry W. Attebery

June 13, 1967 H. W. ATTEBERY 3,324,640

MOBILE FARM IMPLEMENT WITH COTTON HANDLING ATTACHMENTS

Filed Aug. 26, 1963

14 Sheets-Sheet 4

INVENTOR
HENERY W. ATTEBERY
BY Wm. H. Dean

INVENTOR
HENERY W. ATTEBERY
BY
Wm. H. Dean

June 13, 1967 H. W. ATTEBERY 3,324,640

MOBILE FARM IMPLEMENT WITH COTTON HANDLING ATTACHMENTS

Filed Aug. 26, 1963 14 Sheets-Sheet 6

INVENTOR
HENERY W. ATTEBERY
BY
Wm. H. Dean

June 13, 1967 H. W. ATTEBERY 3,324,640

MOBILE FARM IMPLEMENT WITH COTTON HANDLING ATTACHMENTS

Filed Aug. 26, 1963 14 Sheets-Sheet 7

INVENTOR.
HENRY W. ATTEBERY
BY Wm. H. Dean

June 13, 1967 H. W. ATTEBERY 3,324,640

MOBILE FARM IMPLEMENT WITH COTTON HANDLING ATTACHMENTS

Filed Aug. 26, 1963 14 Sheets-Sheet 8

INVENTOR.
HENRY W. ATTEBERY
BY
Wm. H. Dean

MOBILE FARM IMPLEMENT WITH COTTON HANDLING ATTACHMENTS

Filed Aug. 26, 1963

INVENTOR.
HENRY W. ATTEBERY

BY

Wm. H. Dean

June 13, 1967 H. W. ATTEBERY 3,324,640

MOBILE FARM IMPLEMENT WITH COTTON HANDLING ATTACHMENTS

Filed Aug. 26, 1963

14 Sheets-Sheet 10

INVENTOR.
HENRY W. ATTEBERY
BY
Wm. H. Dean

INVENTOR.
HENRY W. ATTEBERY
BY
Wm. H. Dean

June 13, 1967 H. W. ATTEBERY 3,324,640

MOBILE FARM IMPLEMENT WITH COTTON HANDLING ATTACHMENTS

Filed Aug. 26, 1963

14 Sheets-Sheet 12

INVENTOR.
HENRY W. ATTEBERY
BY
Wm. H. Dean

INVENTOR.
HENRY W. ATTEBERY
BY
Wm. H. Dean

INVENTOR.
HENRY W. ATTEBERY
BY
Wm. H. Dean

United States Patent Office 3,324,640
Patented June 13, 1967

3,324,640
MOBILE FARM IMPLEMENT WITH COTTON HANDLING ATTACHMENTS
Henry W. Attebery, P.O. Box 658, Campe Verde, Ariz. 86322
Filed Aug. 26, 1963, Ser. No. 304,738
11 Claims. (Cl. 56—28)

This invention relates to a cotton harvesting implement and more particularly to a cotton harvesting implement having ground and plant contacting rollers employing a novel cotton picking structure utilizing random fibers at the peripheries of the rollers to which mature cotton will adhere.

The present application is a continuation-in-part of my co-pending application, Ser. No. 252,227, filed Jan. 17, 1963, and now abandoned, for Mobile Farm Implement With Cotton Handling Attachments, said copending application being a continuation-in-part of an abandoned application, Ser. No. 148,373, filed Oct. 30, 1961.

In cotton harvesting machinery, according to prior art practice, various structures have been used for picking cotton from the plants as well as recovering loose cotton which has fallen to the ground. Most conventional machinery, utilized to pick cotton from the plants, employs spindles which are operated in close proximity to the plants and which are rotatable or barbed in order to gather mature cotton from the plants.

Various means have been used for recovering loose cotton which has fallen to the ground. The latter operation has been carried out by various devices including slotted belts, as shown in the Rood patent, No. 2,670,584. According to operation of the Rood Cotton Harvester, the belts, when they pass over ground engaging rollers, cause slots in the outer portions thereof to open and grasp articles on the ground. These belts pick up cotton bolls as well as sticks and a great variety of trash.

Many of the prior art devices, utilized to pick up cotton from the ground, have the foregoing fault of operation, namely that of picking up not only the cotton but various articles on the ground, including limbs, grass, leaves, clods of dirt, etc. This greatly adds to the ginning cost of cotton picked up from the ground.

In the operation of conventional cotton harvesters which utilize spindles for picking cotton from the plants, much cotton is knocked off the plants and is left on the ground.

Examples of the spindle-type picking machines may be found in Patents 2,688,223 and 2,702,976.

It will be understood by those skilled in the art that a great variety of these spindle-type picking machines exist. All of the spindle-type picking machines have a variety of faults, including the loss of cotton knocked off the plants as the machine passes them. Such cotton falls to the ground and the spindles of such machines are unable to pick it up. Additionally, many of these spindle machines tend to break the green bolls on the plants, thereby destroying cotton which has not matured and in many instances, these spindles pull the bolls completely off the plant and drop them on the ground so that they have no chance of maturing and are lost to any subsequent harvest.

Accordingly, it is an object of the present invention to provide a novel cotton harvester which utilizes resilient soft rollers capable of efficiently picking mature cotton from plants and also for gathering mature cotton which has dropped to the ground; said rollers being provided with a resilient annular surface composed of random fibers or filaments which are projectable into soft fluffy bolls of cotton and which thereby hold the cotton while it is being removed from the ground or the plants and transferred to an area in which vacuum readily transfers the cotton from the roller to a collecting receptacle.

Another object of the invention is to provide a cotton harvester which is particularly advantageous in picking high grade cotton with a minimum of trash therein.

Another object of the invention is to provide a cotton harvester which will pick high grade cotton from the ground and leave cotton which is stuck to the dirt or mud, thereby discriminating between clean and dirty cotton.

Another object of the invention is to provide a cotton harvester utilizing a rolling wheel having a novel cotton picking surface composed of a resilient soft rubber tire which may be pneumatically inflated and which is provided with a peripheral surface of random outwardly projecting fibers directed in various angular dispositions and which are resiliently held to the periphery of the resilient soft tire in order to provide an ideal cotton pick up surface to be used either for retrieving fallen cotton which is on the ground or for picking cotton directly from the upstanding plants.

Another object of the invention is to provide a novel cotton harvester which may operate ahead of or behind conventional cotton picking machines utilizing conventional cotton picking spindles.

Another object of the invention is to provide a novel cotton harvester which may be operable as a separate unit by any tractor or other means for powering the present cotton harvester so that it may pick cotton from plants and/or from the ground.

One of the objects of this invention is to provide a self-propelled mobile farm implement having a motor from which power is applied to the wheels of the implement to drive the riding wheels and to operate mechanism within the body of the implement, including a pair of blowers and attendant machinery to move cotton from the field into a basket which is positioned within the body of the implement.

Another object is to provide an implement having driving wheels at the rear spaced apart so that they will run in parallel ditches between rows of cotton plants and having an intermediately positioned front wheel which will act as a steering wheel and driving wheel to support the front end of the implement and such appliances as may be attached to the implement body.

Another object is to provide an appliance detachable affixed to the front of the implement frame and thereby become an operational part of the mechanism of said implement having a novel means for picking cotton from the ground which has been knocked down by other picking machines, or by wind and weather.

Still another object is to provide means attachable and removable from the front of said frame which will pick and remove cotton from the plants growing in the field through which the implement traverses.

Still another object is to provide means for receiving cotton removed by either of the two appliances above mentioned and temporarily storing it on the implement and removing it by automatic mechanical means when desired.

Still another object is to provide a means for transmitting power from said motor supported within the implement body to a blower and to driving means for the wheels supporting the implement body and to mechanical mechanisms supported on the body for the purpose of picking up and removing cotton from either the ground or from plants growing in rows in said ground.

An additional object of the invention is to provide a means for mounting random fiber coated cotton collector wheels in relation to a vehicle so that such wheels may be rotatably motivated on the surface of the ground and be permitted to pivot in a caster-like fashion and also may be permitted to pivot about a substantially horizontal axis directed substantially parallel to the direction in which the vehicle moves.

Another object of the invention is to provide a means for mounting random fiber coated cotton pick up rollers on a motivating vehicle such as a conventional cotton picker or any other vehicle adapted to motivate said rollers in a manner to permit them to roll on the ground; said mounting means including novel means for elevating the rollers above the surface of the ground during a non-use interim.

Other objects will appear hereinafter.

The particularly new and novel structure disclosed here concerns the mechanism for picking up and handling cotton and for emptying the cotton storage basket within the body of the implement.

I attain the foregoing objects by means of the devices, parts and combinations of parts shown in the accompanying drawings, in which:

FIGURE 18 is a fragmentary view of rearward portions of a vehicle showing a modification of the present invention comprising means for attaching and towing random fiber coated rollers according to the present invention behind a vehicle or for motivating the rollers of the invention in connection with any portion of a vehicle;

FIGURE 19 is an enlarged fragmentary sectional view of a portion of a random fiber coated roller of the invention and its axle mounting means.

FIGURE 20 also illustrating by broken lines an elevated position of the rollers of the invention accomplished by the mounting means therefor;

Figure 1:
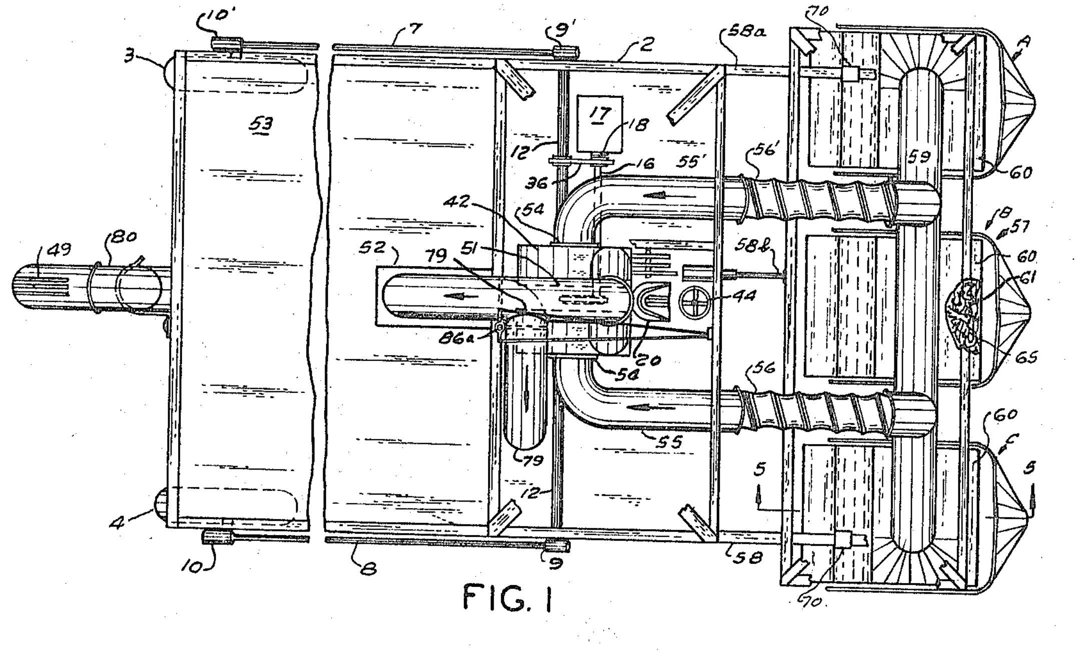
FIGURE 1 is a plan view of an implement embodying my improvements and accessories.
Figure 8:
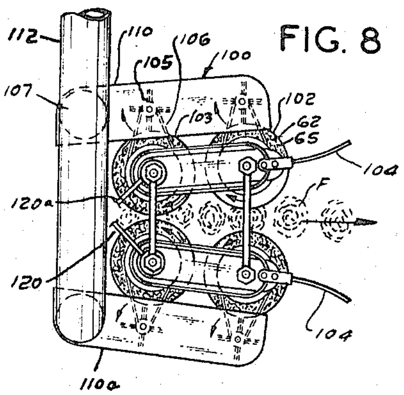
FIGURE 8 is a plan view of a modified attachment for the implement, shown in FIGURES 1, 2, 3 and 4, said attachment being used for picking cotton from rows of cotton plants.
Figures 29, 30:
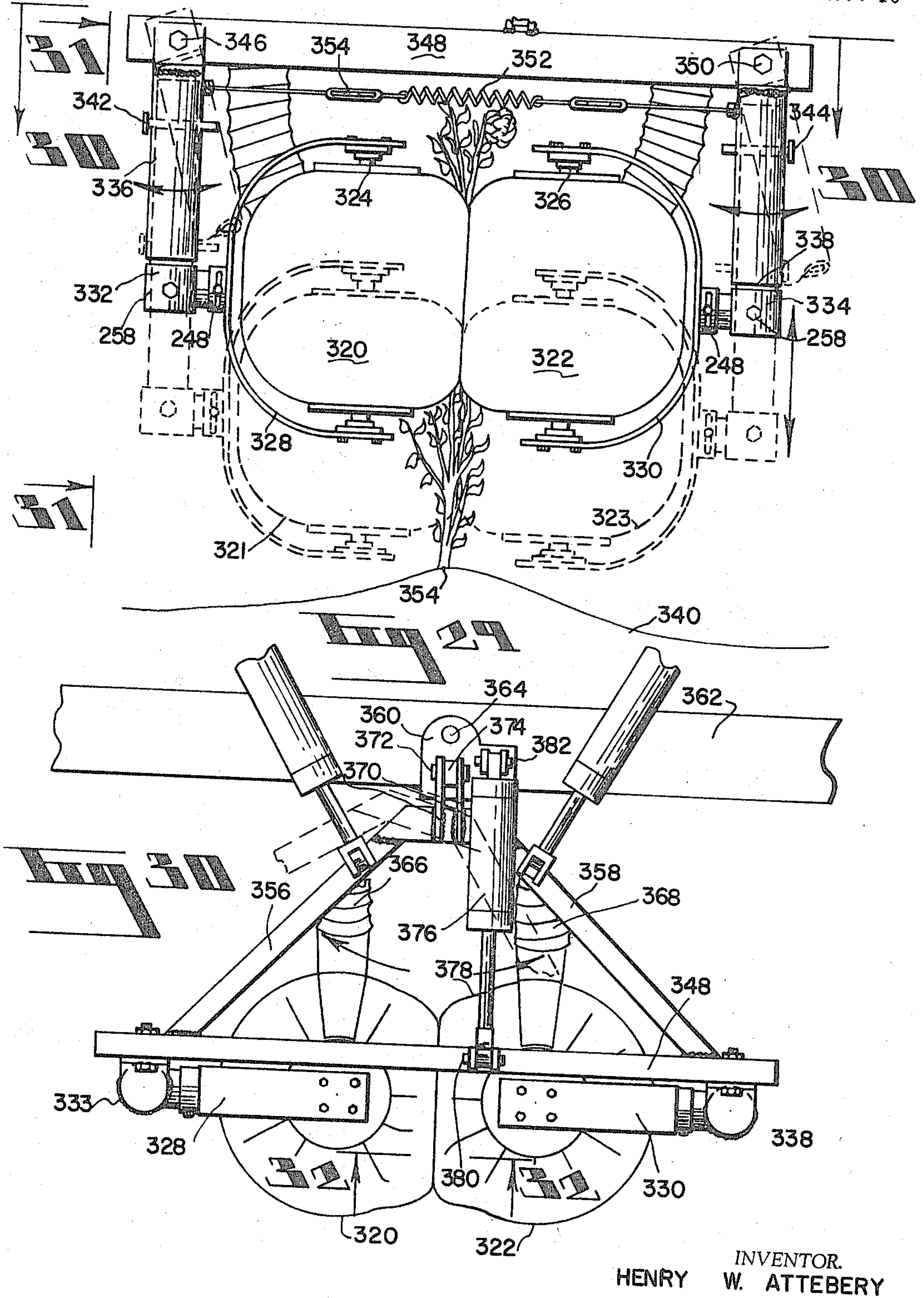
FIGURE 29 is a front view of a cotton harvesting machine in accordance with the present invention, and, more particularly, this figure discloses a modification of the structure shown in FIG. 8 of the drawings to allow lateral resilient movement of cotton picking rollers operable at opposite sides of vertical cotton plants; said rollers having a random fiber coating on the outer surfaces thereof.
FIGURE 30 is a top or plan view of the modification shown in FIG. 29 taken from the line 30—30 of FIG. 29.
Figures 31, 32:
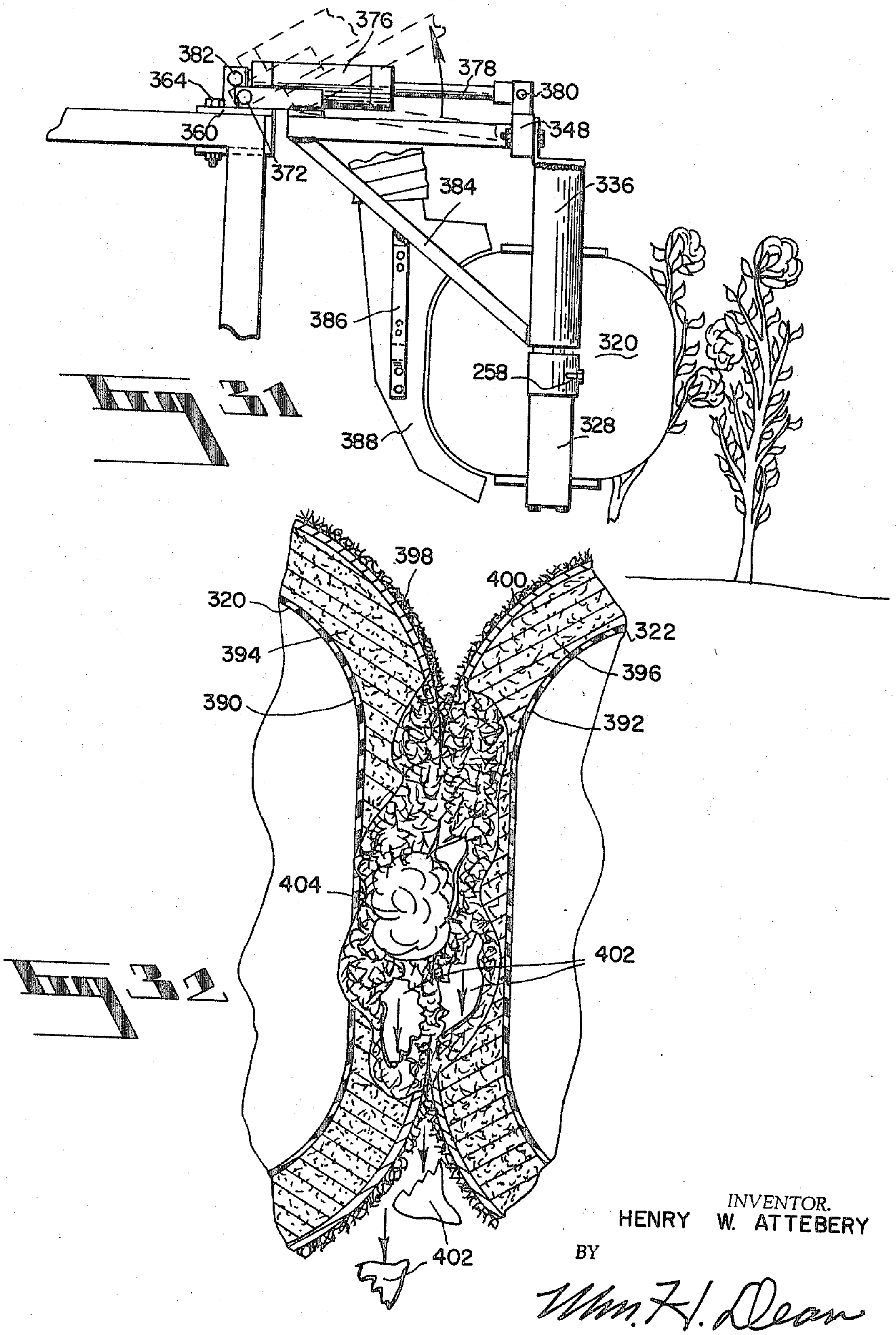
FIGURE 31 is a side elevational view of the structure shown in FIG. 29 and taken from the line 31—31 of FIG. 29.
Figure 33:
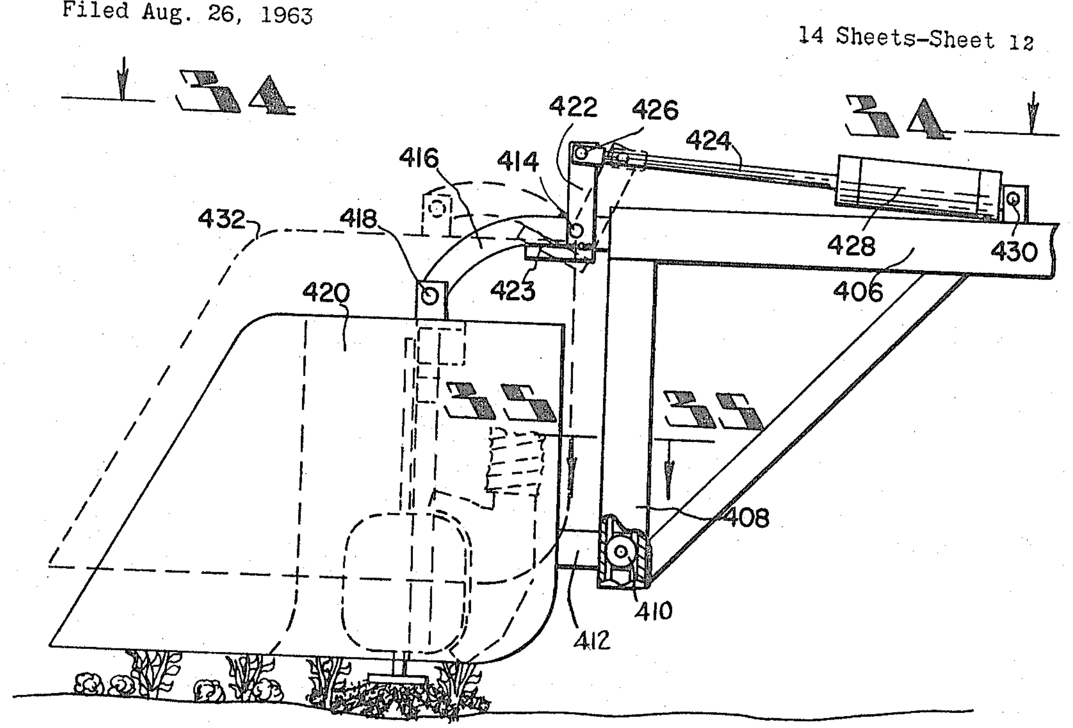
Figures 34, 35:
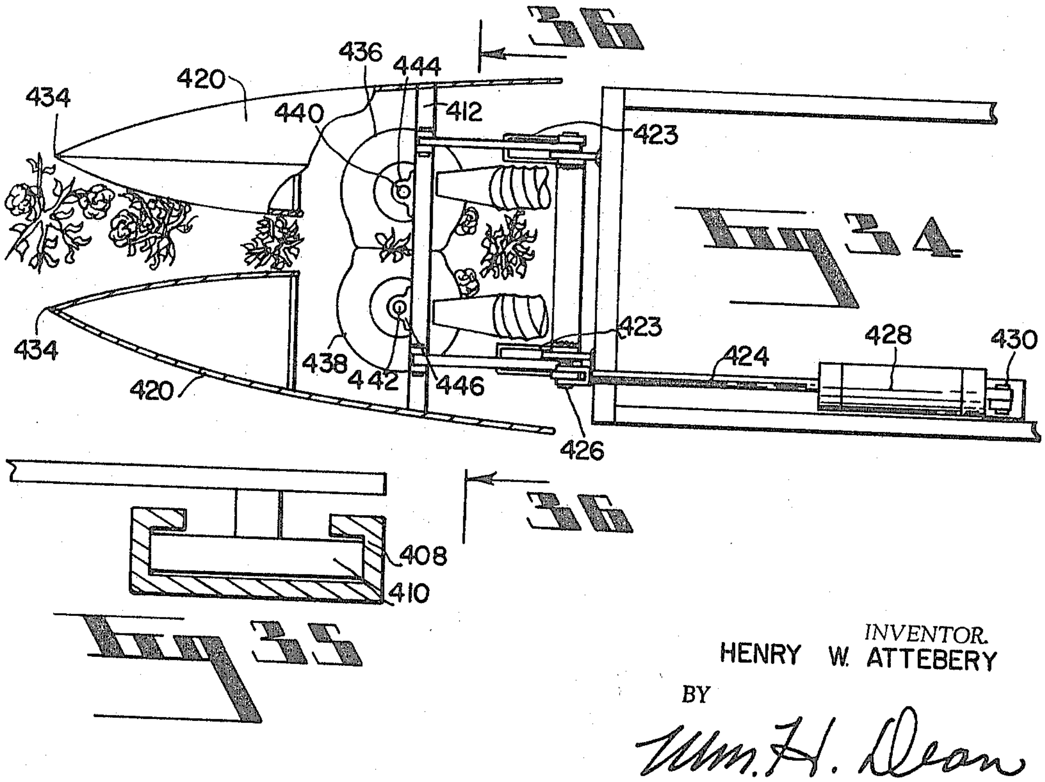
Figure 36:
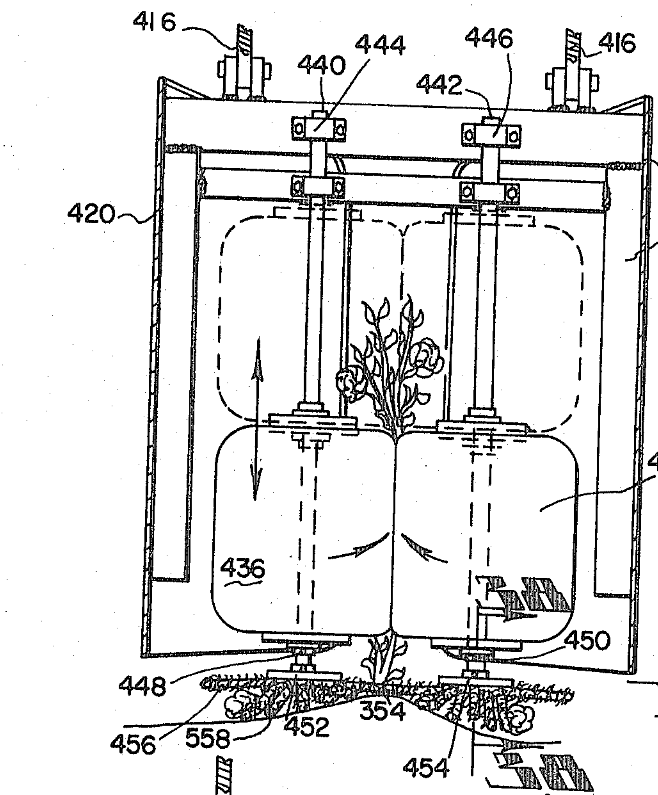
Figure 38:
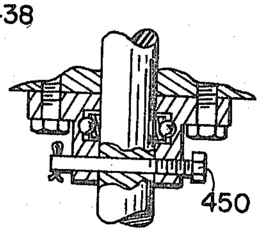
Figure 37:
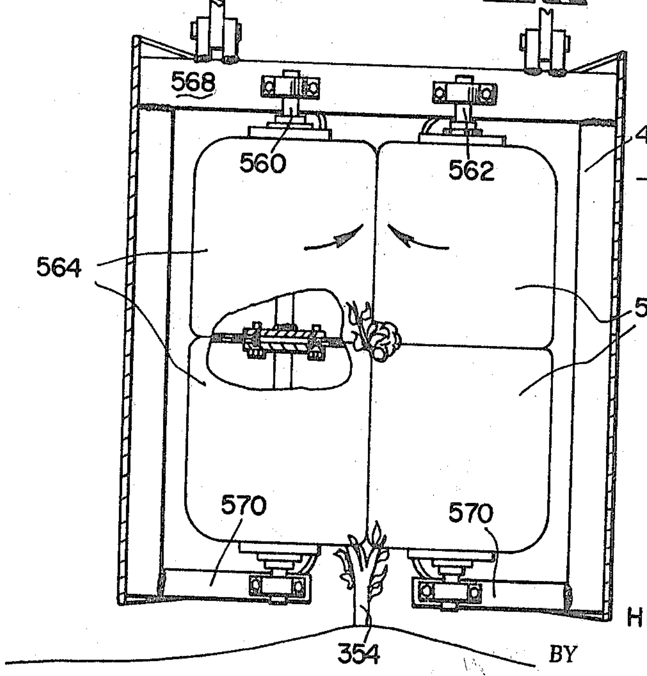
Figure 39:
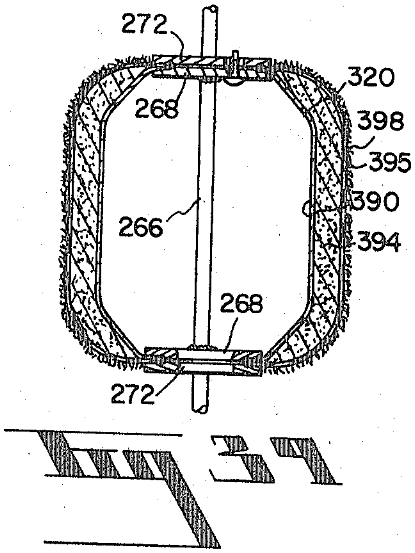
Figure 40:
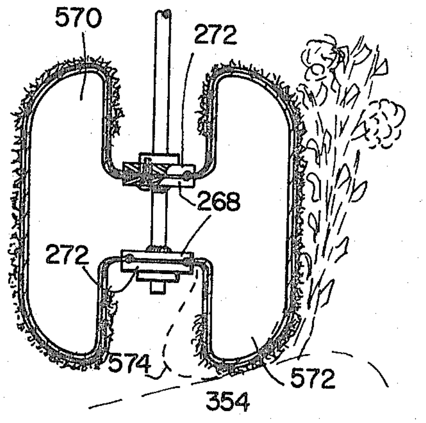
Figures 41, 42:
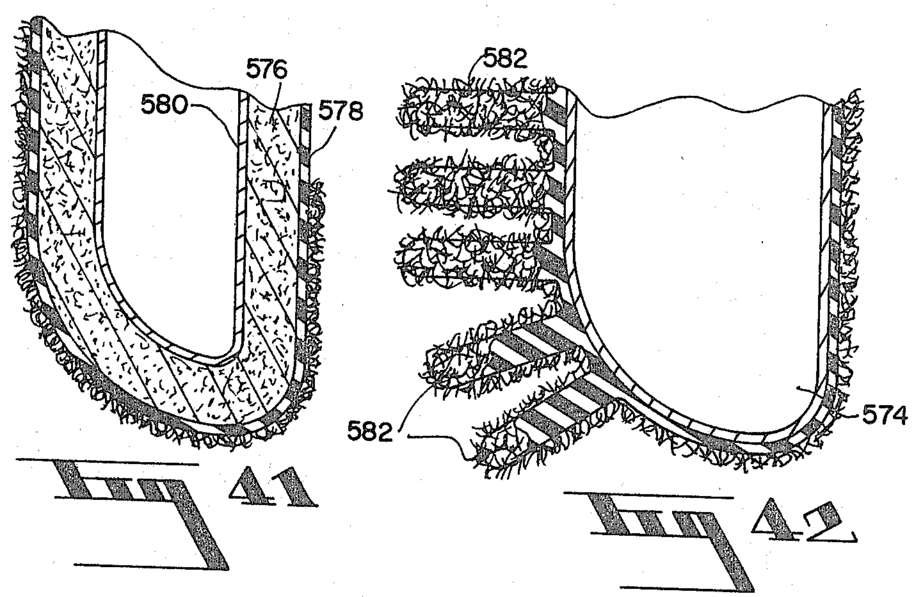

FIGURE 32 is an enlarged fragmentary sectional view taken from the line 32—32 of FIG. 30 showing a sponge rubber layer structure supporting a random fiber coating at the peripheries of cotton picking rollers of the invention and illustrating the manner in which the resilient structure of the rollers causes the shell on a cotton boll to crack away and fall to the ground during rolling action of the rollers in opposed relationship to each other when engaging ripe cotton bolls and harvesting the cotton therefrom;

FIGURE 33 is a side elevational view of another modification of the invention disclosed in FIG. 8 of the drawings and illustrating by broken lines a varying position of the cotton picking rollers of the invention and shield mechanism carried adjacent thereto;

FIGURE 34 is a top or plan view of the structure shown in FIG. 33 and taken from the line 34—34 of FIG. 33;

FIGURE 35 is an enlarged fragmentary plan sectional view taken from the line 35—35 of FIG. 33;

FIGURE 36 is an enlarged sectional view taken from the line 36—36 of FIG. 34 showing cotton picking rollers disposed to engage opposite sides of cotton plants to pick cotton therefrom; said rollers having random fiber surfaces and being connected to annular rows of fingers engageable with the stalks of cotton plants to drive the cotton picking rollers thereabove;

FIGURE 37 is a view similar to FIG. 36 but showing a modification of the invention wherein the cotton picking rollers are driven only by frictional engagement with cotton plants;

FIGURE 38 is an enlarged fragmentary sectional view taken from the line 38—38 of FIG. 36;

FIGURE 39 is an axial sectional view of a soft pneumatic cotton picking roller of the invention showing a modification thereof wherein an outer layer of random fibers is supported on a soft sponge rubber layer carried on the outside of a pneumatic tire to provide for extremely gentle cotton picking action of the rollers when pressed against plants in opposed relationship at opposite sides of the plants as shown best in FIG. 34;

FIGURE 40 is an axial sectional view of a modified form of pneumatic cotton picking roller and illustrating by broken lines extreme deflection of the roller in a position adjacent to the ground and to the trunks of cotton plants;

FIGURE 41 is an enlarged fragmentary sectional view showing a fragmentary portion of the cotton picking roller disclosed in FIG. 40; and FIGURE 42 is a view similar to FIG. 1 showing a further modification of the invention wherein the tire as shown in FIG. 40 of the drawings may be provided with a plurality of outwardly extending fingers covered with random fibers.

Similar numerals refer to similar parts in the several views.

Figure 2:
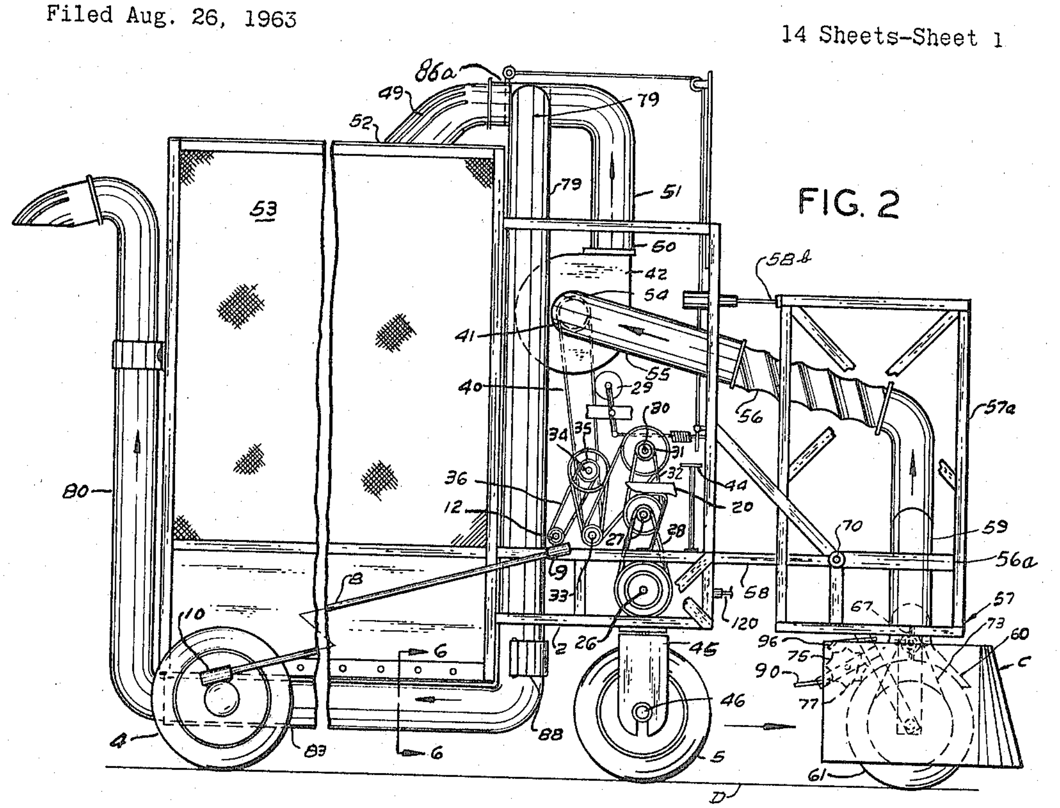
FIGURE 2 is a side elevational view thereof.

The cotton harvester of the present invention may be operable ahead of a machine, such as shown in FIGURE 2 of the applicant's drawings, or it may be operable ahead of cotton harvesting machines such as disclosed in the foregoing patents which cover conventional spindle-type cotton harvesters. It will be understood that the cotton pick up rollers, of the invention, may be ground driven and may operate either ahead of or behind the spindles of such machines, as shown, for example, in Patent 2,688,223, or the cotton pick up rollers of the present invention may be operated in a similar manner to that disclosed in the Rood Patent 2,670,584. Thus, the invention may be used in a separate machine to follow cotton harvesters and pick up cotton left on the ground after the conventional spindle-type cotton pickers have passed thereover.

It will be further understood that the cotton harvester of the present invention, as shown in FIGURE 8 of the applicant's drawings, may be utilized to replace the spindle structures of such machines as those disclosed in the prior art, as for example, applicant's rollers, as shown in FIGURE 8, might be used to replace the spindle picking structures, shown in Patent 2,688,223, or any other equivalent machine.

It will be appreciated by those skilled in the art that the structure, as shown in FIGURE 8 of the applicant's drawings, provides for the picking of cotton from plants whereby the cotton picking rollers are disposed in opposed relationship at opposite sides of a row of plants and whereby the random fibers, at the surfaces of these rollers, gently pick cotton from the plants without removing green bolls and without breaking them. The spacing of these rollers may be such that they positively will not crush or break green bolls or any bolls which are not mature enough to permit withdrawal of the mature cotton from the plants.

Further, it will be appreciated by those skilled in the art that the random fiber surface rollers may be used primarily as shown in FIGURE 8, to pick cotton from plants and may then be followed by other sets of rollers, in accordance with the invention, such as disclosed in FIGURE 2 of the drawings, for picking the cotton from the ground. Thus, any cotton which may fall to the ground may be picked up at the same time that the rollers, as shown in FIGURE 8 of the drawings, harvest the cotton from the plants.

Referring to FIGURES 1 and 2, 2 indicates the frame of the implement in general. This frame is supported on riding wheels 3 and 4 at the rear and wheel 5 at the front. The rear wheels 3 and 4 are driven through shafts 7 and 8, respectively, which operate on the sides of the frame or body 2 and extend from the driving gearing 9 and 9' at the front to the driven gearing 10 and 10' at the rear, on each side of the implement body.

At the front, the side shafts 7 and 8 are driven by a shaft 12. Shaft 12 is driven by belt 36 from shaft 16 of motor 17 through slip clutch 18.

Steering of the wheel 5 is accomplished through steering wheel 44 operatively connected to fork 45 and positioned in front of and above seat 20.

The outlet opening 50 of blowers 42 is connected to pipe 51 which opens at 52 into the top of cotton receiving cage 53. Slits 49 let excess air and dirt escape while the inertia of the cotton carries it on into the cage 53. The suction inlets 54 and 54' of blowers 42 and 42' are connected to pipes 55 and 55' to the cotton pick up unit generally indicated by numeral 57.

The frame **57*a* of this unit is connected to the body 2 of the implement by pivot pins 70 on frame extensions 58 and 58*a*. Tilting of frame 56*a* on pivots 70 to raise and lower shields A, B and C by hydraulic ram 58*b***.

Figures 3, 4, 5, 6, 7:
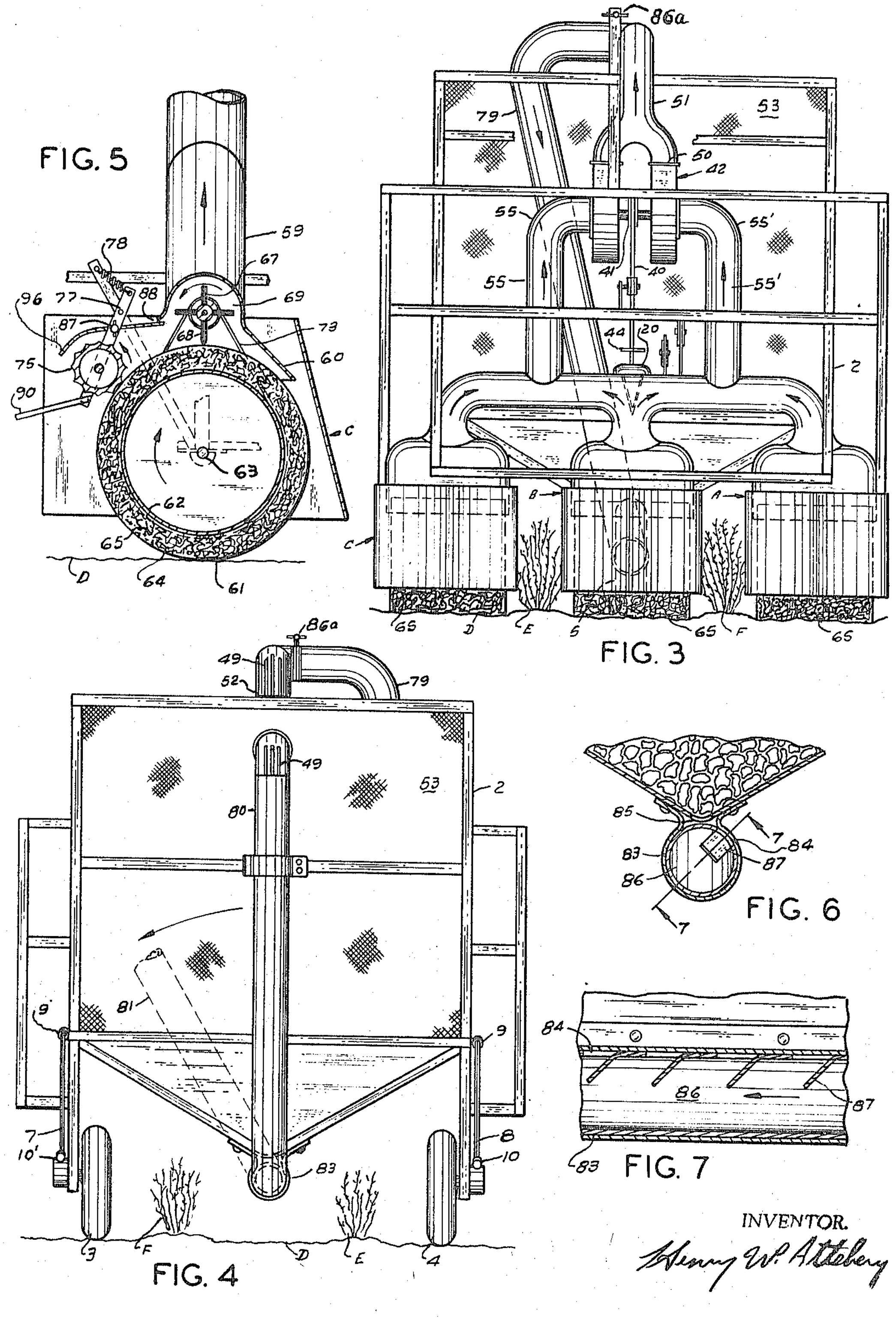
FIGURE 3 is a front elevational view thereof.
FIGURE 4 is a rear elevational view thereof.
FIGURE 5 is a side elevational view of the front portion of the machine with portions sectioned off along line 5—5 of FIGURE 1; the figure being drawn on a somewhat enlarged scale.
FIGURE 6 is a sectional elevational view of a fragment of the lower portion of the cotton receiving basket, said section being taken substantially on line 6—6 of FIGURE 2.
FIGURE 7 is a longitudinal section of a fragment of the cotton emptying pipe, drawn on an enlarged scale and with said section taken substantially on line 7—7 of FIGURE 6.

Considering the details of the cotton pick up units 57, reference is made to FIGURE 5. Here the suction pipes 59, leading to the blowers 42, are connected to the top of funnel 60. The funnels cover the top of cotton pick up cylinders 61. As shown in FIGURES 2 and 3, there are three of these pick up drums under funnels 60. The cylinders 61 (FIGURE 5) are composed of an inner metal cylinder 62 which is journalled on a shaft 63 so as to roll freely over the ground. A sleeve of pick up material 64 is placed around each cylinder 62. This pick up material comprises a sleeve of resilient material composed of a mass of curled and curved lengths of stiff fibrous material 65 matter together by an elastic cement. The composite material is somewhat stiff and firm as compared to fibers of mature cotton bolls. The fibers are made from lengths of synthetic materials, as for example, hard plastic fiber or lengths of yucca fibers or any equivalent material, such as various animal fibers, including hog bristles or the like.

Curled lengths of fibrous material are stuck together in random fashion by any suitable adhesive, such as rubber or soft vinyl plastic. The mat of curled fibers may either be dipped in the plastic or it may be sprayed on. The result is a resilient pad having a body mass of curled stiff resilient fibers with numerous ends extending outward from the surface of the pad at random positions. The fiber ends form stickers which stick into and engage tufts of cotton on the ground when the pad, on the cylinder 62, is roller over them.

I have found that a cylindrical roller, having a resilient cylindrical pad, as above described, when rolled over a field containing waste cotton will pick up any tufts encountered on the ground and that these tufts will adhere to the surface of the roller as it rolls upward from the ground.

It will be appreciated by those skilled in the art that the random fiber surface of the rollers of the cotton harvester, in accordance with the present invention, discriminates between high grade mature cotton and all other materials which normally are picked by conventional spindle or other type machines. As for example, the random fibers will not hold plant leaves, sticks, green bolls, or other such material. The random fibers will only attract and hold mature cotton which is impaled by the ends of these random fibers. This function is true when the rollers are used to pick the cotton from the plants, as shown in FIGURE 8, or when the rollers are engaged with the ground, at their periphery, at which time the soft, clean, high grade mature cotton will be impaled and stick to the random fibers at the surface of the rollers. Any cotton adhered to the ground by mud or any cotton which is heavily loaded with dirt or clods will not be picked up by these rollers. Thus, the rollers discriminate between trash and the soft, fluffy, high grade cotton, all of which provides an economic advantage of picking the optimum value out of the entire cotton harvest. The rollers of the present invention pick up the valuable cotton and leave the trash and other foreign matter which only creates high gin costs and thus, the present invention provides a great economic advantage over other known cotton harvesting machines and methods.

Near the top of its travel and above the upper surface of the roller, I provide in each unit a paddle wheel 67 having four paddles 68 revolving under elongated funnel cover 60. As wheel 67 revolves, the edges of the paddles strike the tufts of cotton adhering to the surface of the pad 64 and knock the tufts loose so that they are sucked up into funnel 60 and the lower end 69 of suction pipes 55 and 55'. From these pipes, the cotton is delivered through the opening 52 into the top of cage 53, after passing through the blowers 42 and 42'.

As illustrated herein, there are three funnels 60 covering three rollers 61 forming three pick up units A, B and C. The suction pipes 59 are joined into the twin blowers 42 and 42', respectively, and the output of the blowers 42 and 42' are discharged into pipe 51. Pipe 51 connects to the cage 53 through the opening 52, as above explained.

The position of rollers 61 above the ground may be varied, as desired, by tilting frame **57*a* on pivot 70**. In this way, the three units A, B and C, as shown in FIGURE 3, may be moved over the ground D and between rows of cotton plants E and F in order to salvage all cotton knocked down from the plants.

The rollers 61 are shown as being rotated by contact with the ground. However, they may be power driven, if desired. A belt 73 from the roller cylinder 62 may be used to drive the paddle wheel 67 and this turns at a greater speed than the speed of the rollers.

In order to crush cotton bolls picked up and retained on the pad 64, I provide a corrugated cylinder 75 which turns by rolling in resilient contact with the pad 64, and is held in contact with the pad by the framework including the end beams 77 pivoted at 89 to frame piece 76 tensioned by spring 78. Draft over roller 75 may be regulated by tilting shield 96 on pins 87 to let some of air entering pipe 59 to enter slit 88, if desired. An apron 90 directs crushed bolls away from roller 61.

In operation, cotton on the ground D is picked up by the pad 65 and loose cotton is knocked loose by paddles 68 and sucked into pipes 59 and moved to the cage 53. Any bolls not fully opened but picked up by the rolls 64 are broken by the crushing roller 75 and their cotton, when exposed, is also sucked up through pipe 59.

When it is desired to remove cotton from the bin 53, the outlet delivery pipe 80 is moved from the vertical position shown in FIGURE 4 to a position slightly to the left, as indicated by dotted line 81. In this position the inner portion 86 of longitudinally extending pipe 83 on the bottom of the cage 53 is rotated so that the openings 84 in this pipe become in register with the openings 85 in the bottom of the bin. When this is done, cotton drops into the central portion 86 of the pipe 83 and is subjected to draft from pipe 79, shown in FIGS. 1 and 2, coupled to the outlet side of the blower by a valve **86*a*. Fins 87, when contacted by air flow from right to left creates a suction in holes 79 and into area 86, caused by velocity of air from double blowers 42 and 42' through area 86. Communication with the blower pressure may be made by closing valve 86*a* on the outlet side of pipe 52. Note that the pipe, generally indicated as 86, is composed of an outer and inner part. These parts telescope to form the valves which open and close the openings 85** in the bottom of the cage.

When positive pressure is applied to pipe 86 from pipe 79, cotton is drawn into the pipe 86 and forced out through the delivery pipe 80. Valve **86*a* is closed during this operation to force all the air through pipes 79, 80 and 86 from the dual blowers 42 and 42'**.

The mechanism above described will therefore pick up cotton from the ground and deliver it to and accumulate it to the cage 53 and discharge it through pipe 80 into any convenient vehicle.

Figure 10:
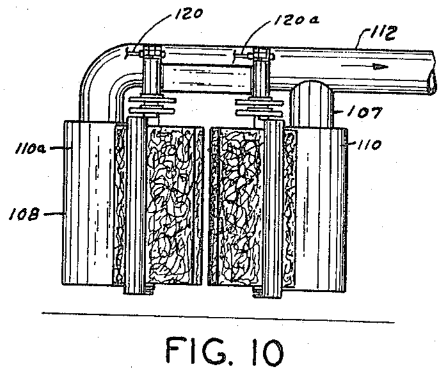
FIGURE 10 is a front elevational view of the device shown in FIGURE 8.
Figure 9:
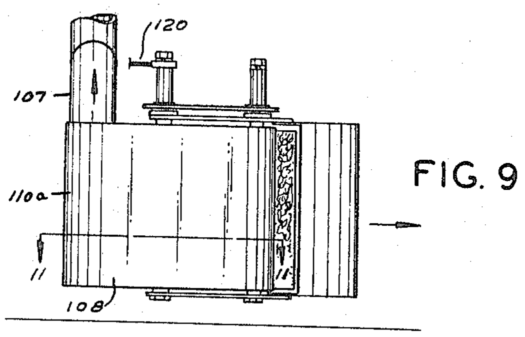
FIGURE 9 is a side elevational view of the device shown in FIGURE 8.
Figure 11:
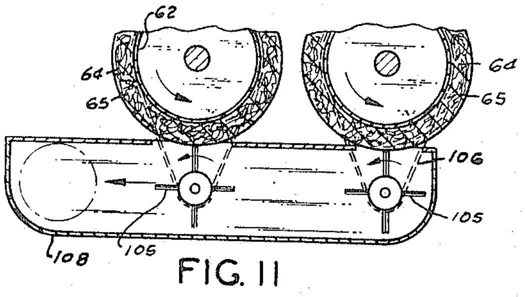
FIGURE 11 is a plan view, partially in section, of the picking elements and cotton removing elements of the device, shown in FIGURES 8 and 9, said section being taken substantially on line 11—11 of FIGURE 9.

In addition to the foregoing, it will be noted that the attachment shown in FIGURES 8 through 11, may be carried by a frame similar to the frame **56*a* and it may be held on removable pins 70 in a similar manner. This attachment is given the general number 100 and consists of three units, each consisting of two pairs of rollers 102 and 103 on each side of the plants F, as viewed in FIGURE 8. These units, having rollers 102 and 103, are each the same, and each unit includes the rollers which are substantially the same as rollers 61, shown particularly in FIGURE 5 and previously explained. Rollers made in the fashion and manner previously explained in detail have the ability to pick cotton from the plants F. They are here arranged vertically, as shown in FIGURES 8 through 10, and derive rotary motion from shaft 26 through flexible shafts 120. Cotton picked from the plants and held on the surface of these rollers is knocked off by the knocker wheels 105 driven by belts 106 which derive motion from the cylinders 62 on which the picking pads 65 are held. These knocker wheels knock the tufts of cotton loose so that they may be sucked into hoods 110 and 110*a* and pipe 107 which is joined to a manifold 108, as shown in FIGURE 9. All the cotton knocked loose is thus drawn into the pipes 59 which are connected to pipe 112 and is then transferred to the cage 53** in substantially the same manner as the cotton derived from the ground.

Note that the rollers 62 with their pads 65 roll on each side of the row of plants F and each roll drives a knocker roll 105. The two rolls on each side of the row F are partially enclosed by hoods 110 and **110*a*. The picking rolls 65 operate within and under these hoods. In this way tufts of cotton caught by the material on the surface of the rolls and loosened by the knockers, is all sucked into the branch pipes 112 and these branch pipes are, in turn, connected to the pipe 59 which leads to the cage 53**, as above explained.

In the modification as shown in FIGURES 12 to 16, inclusive, of the drawings, the rollers or cylinders **61*a* are rotatably mounted on axles 63**, as shown in FIGURES 3 and 5 of the drawings.

Disposed in fixed position relative to the peripheries of the rollers **61*a* are suction or vacuum casings 115 which communicate with the peripheries of the rollers 61*a* outwardly of the random fiber or cotton impaling element surface structures 64** in order to gather cotton therefrom, as will be hereinafter described.

The casings 115 are provided with vacuum seal flaps 116 at the roller escape side 117 thereof. These flaps 116 being soft arcuate flaps which may be made of rubber or other suitable material and which operate closely adjacent the random fiber surface portions 64 in order to provide a substantial seal for vacuum drawn in the housings 115 and directed to the intake of a blower through the cotton pick up conduit 118 communicating with each casing 115.

At a wheel approach side 121 of each casing 115 are resilient seal flaps 122 which are similar to the flaps 116, however, these flaps 122 are deflectable away from the periphery of the rollers **61*a* by vacuum in the casing 115 while the flap 116 is deflected toward the roller 61*a* by vacuum in the casing 115 thereby permitting air to flow into the casing 115 principally through the wheel approach side 121 of the casing 115. Thus, clearance of the flaps 122 is automatically attained by a vacuum in the casing 115 thereby permitting bolls of cotton 124 carried on the random surface fiber structure of the roller 61*a* to pass under the flaps 122** when deflected inwardly by vacuum whereupon the bolls 124, as they approach the interior of the casing 115, are subject to high flow velocity and are thus readily removed from the random surface structure 64 as they approach the interior of each casing 115 so that these bolls of cotton are readily carried by air flow through the conduit 118 and into a basket or other receptacle provided to receive and store the bolls of cotton primarily picked up by the rollers 61*a*.

It will be seen that the flap 116, at the wheel escape side 117 of the casing 115, is at all times held substantially close to the periphery of the rollers 61*a* by vacuum in the casing 115, while the flaps 122 are directed in the same disposition that is in a direction of wheel rotation to thus permit entry of the cotton bolls and to permit the vacuum to draw these flaps 122 away from the periphery to provide inlet clearance for the cotton being carried on the periphery of the wheel. Thus, the vacuum in the casing 115 is devoted, entirely, to removal of the cotton from the periphery of the roller 61*a* and is conserved at the wheel escape side of each casing 117.

Figures 12, 17:
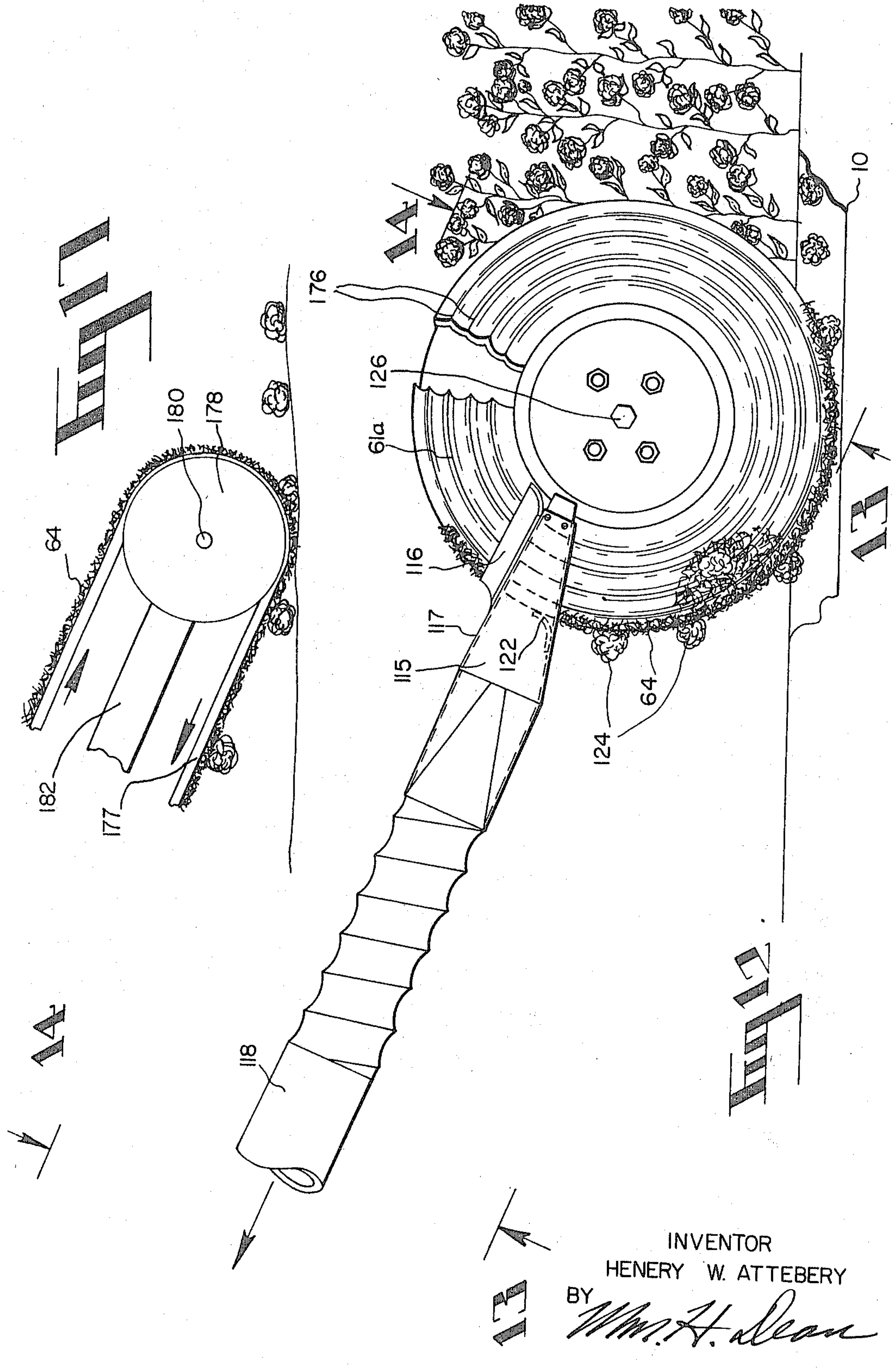
FIGURE 12 is a fragmentary side elevational view of a modified form of the present invention shown in operable position picking up cotton from the ground adjacent a row of cotton plants.
FIGURE 17 is a fragmentary side elevational view of a modification of the invention.

The minimum friction on the random surface structure 64 provided by the structure of the modification, as shown in FIGURE 12 of the drawings, tends to conserve the cotton impaling structure 64 and thereby prolong the life of the cotton harvester in accordance with the present invention. The brushing 116 bearing against the cotton impaling elements 64 creates a magnetism that is favorable to the cotton pickup function.

Figure 14:
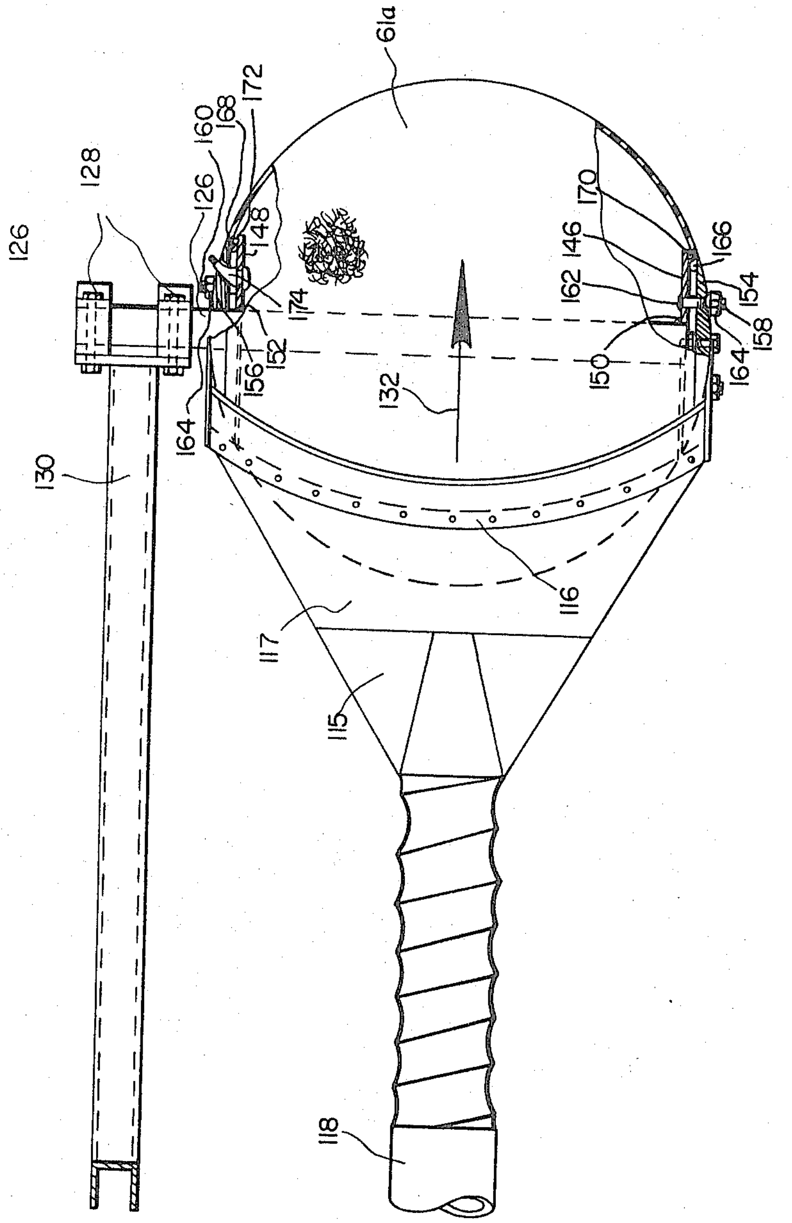
FIGURE 14 is a top or plan view taken from the line 14—14 of FIGURE 12.
Figures 16, 17:
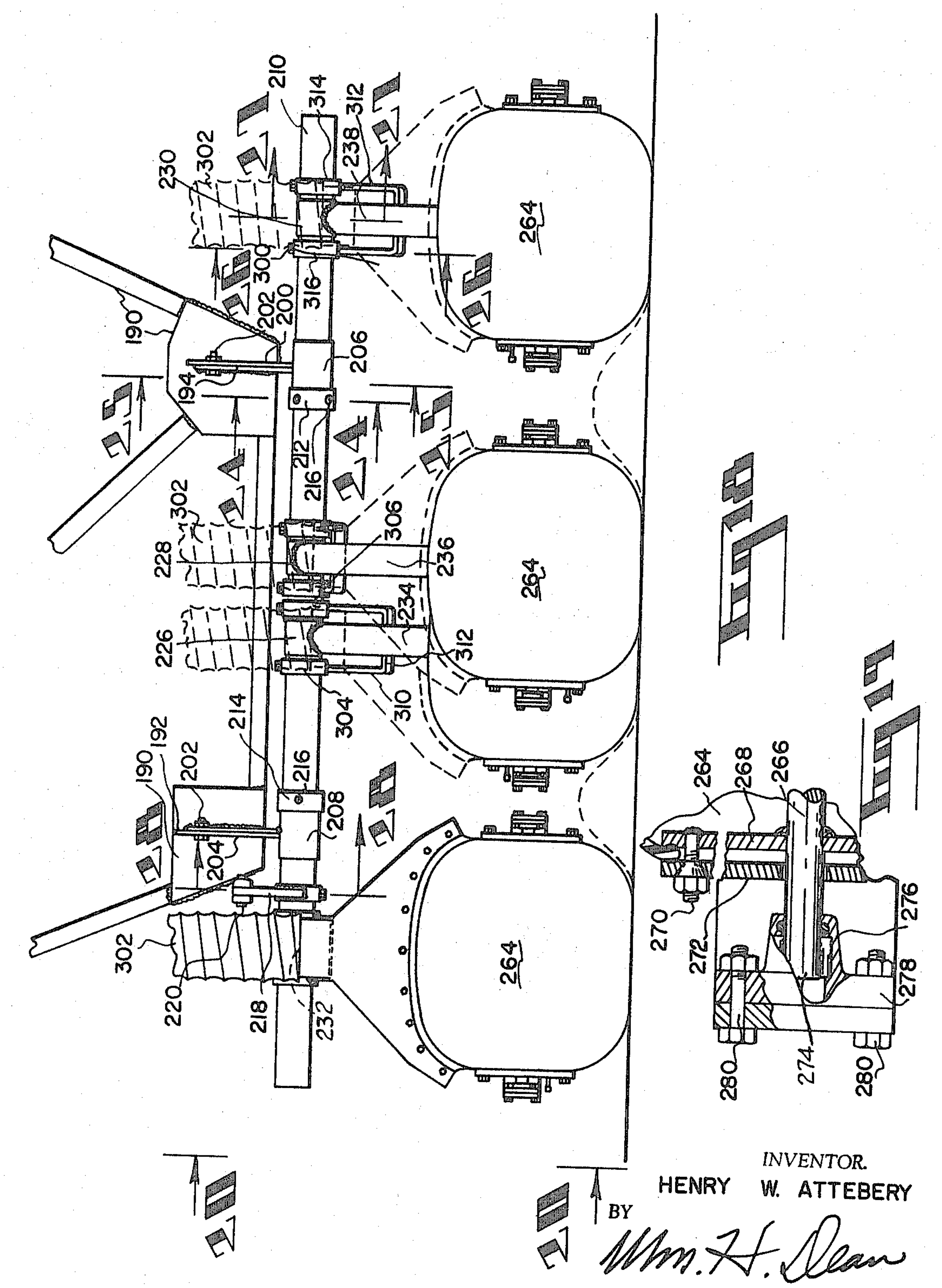

As shown in FIGURE 14, the casing 115 diverges from the conduit 118 and is provided with an arcuate portion of the flap 116 which extends over the entire lateral surface area of the roller 61, which is adapted to contact and shape itself to the contour of the ground.

The rollers 61*a* are rotatably mounted on a suitable axle structure 126 which is cantilevered from supports 128 carried by structural arm 130 which may be mounted on any implement or machine, as desired, and as hereinbefore described.

Figures 13, 15, 16:
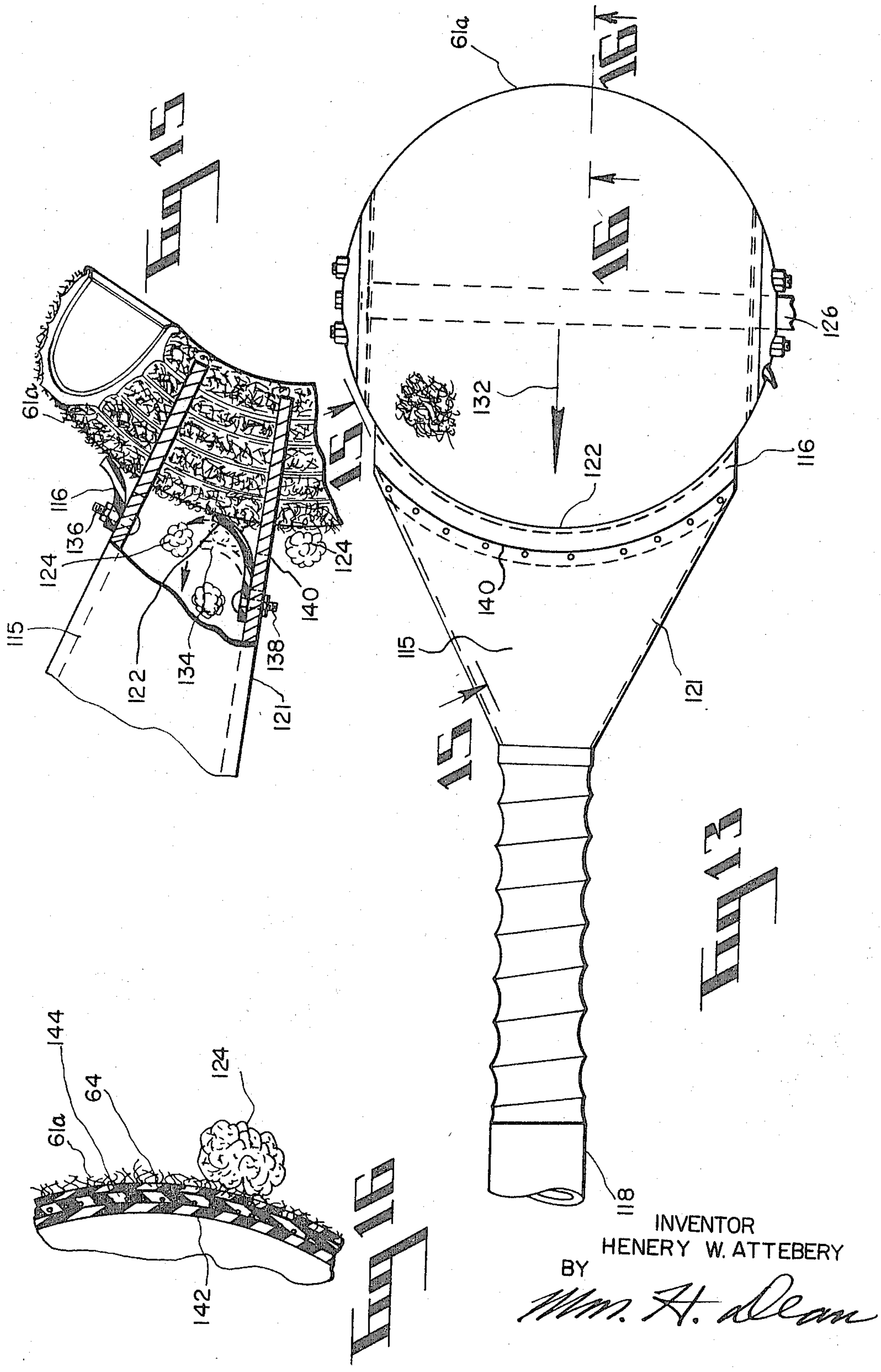
FIGURE 13 is a bottom plan view taken from the line 13—13 of FIGURE 12.
FIGURE 15 is a fragmentary sectional view taken from the line 15—15 of FIGURE 13.
FIGURE 16 is an enlarged fragmentary sectional view taken through the periphery of one of the cotton pick up rollers of the present invention and showing, on enlarged scale, the construction of the cotton pick up surface area thereof.

It will be seen that the roller 61*a* rotates in a direction of arrows 132, in FIGURES 12, 13 and 14 of the drawings, with respect to the lips of the flaps 116 and 122 which are directed from the escape and approach sides of the casings 115 in order to accomplish the hereinbefore described functions of sealing vacuum and permitting receptive clearance to the cotton carried on the periphery of the roller and transferred into the casing 115 by vacuum.

As shown in FIGURE 15 of the drawings, the flap 122 may be deflected into a broken line position 134 by vacuum existing in the casing 115 in order to provide proper clearance for cotton entering on the peripheral portion 64 of the roller 61*a*.

The flaps 116 and 122, as hereinbefore described, are preferably made of soft, resilient material, such as rubber, and may be bolted to the casing 115 by bolts 136 and 138, respectively. Thus, the flaps 116 and 122 may be replaced, as desired, and the casing 115 may be made of metal or plastic with sufficient clearance at the periphery of the wheel to permit cotton to enter the interior of the casing. As shown in FIGURE 15 of the drawings, the casing is provided with an opening 140 which may be spaced substantially an inch and one-half or more from the periphery 64 of the roller 61*a* so that cotton may readily enter the interior of the casing 115 under the flap 122.

The random curled fibers, as disclosed herein, and forming cotton pick up tread of the rollers or wheels may be of various material, as hereinbefore described, and may be varying in length, as for example, the length of these fibers may vary from one-quarter of an inch to three-quarters of an inch and may vary from nine-thousandths of an inch in diameter to twenty-thousandths in diameter, in some instances. Additionally, these fibers may have varying hardness and tensile strength in proportion to their lengths and diameters.

The random curl of these fibers is such, that they, when compressed against cotton bolls on the ground or on plants may cause the fibers to impale the cotton and due to the random direction of these fibers, the ends are directed in various directions, and when the cotton boll is removed from the ground or from a position adjacent to plant, the varying direction of several of the fibers retains the cotton boll thereon until it reaches the interior of a respective pick up hood whereupon vacuum acting on the cotton boll tends to pull it from the fibers, thereby slightly straightening out the curled portions of the fibers into a direction of air flow, thus, the fibers are forced to straighten out and release the cotton therefrom. In this manner, the cotton is not retained on the fibers and they are again free to rotate into engagement with further cotton bolls for continued operation of these random fibers. The random fibers, after they pass from the area of the vacuum in the hood, again assume their curled condition and since they are all directed in different directions at their curled portions, some of the ends of these fibers are disposed, as for example, almost tangentially when hooked into cotton bolls and may be turned in a direction opposing gravity when the cotton bolls are carried thereby to the interior of the collection hoods.

It has been found that the relative diameter length and stiffness of these fibers may be varied in order to provide the proper cotton gathering character of the device for both the collection of cotton from the ground or from plants, as hereinbefore disclosed, particularly in FIGURE 8 of the drawings.

As shown in FIGURE 16, each roller 61*a* is a hollow structure having a soft resilient tire 142 or some other soft supporting structure. The tire may be pneumatically inflated or may be of any suitable deflective structure, as for example, the tire may be made of sponge rubber or the like.

The periphery of the tire is provided with a layer of adhesive material 144 which holds the random fibers or cotton impaling elements 64, at the periphery of the roller, as hereinbefore described.

As shown in FIGURES 13 and 14, each tire 61*a* is mounted on a shaft 126 which is rotatably mounted in the bearings 128.

On the shaft 126 are spaced flanges 146 and 148. These flanges 146 and 148 being welded at 150 and 152 in hermetically sealed relation with the shaft.

Second external flanges 154 and 156 are fitted over bolts 158 and 160, carried by the flanges 146 and 148, said bolts 158 and 160 being welded at 162 in a hermetically sealed relationship with the flanges 146 and the bolts 158 project through openings in the flange plates 154 and are held in secure position relative thereto by nuts 164 externally of the plate 154 and 156.

The tire 61*a*, as shown in FIGURE 14, is provided with an annular bead structure 166 between the plates 146 and 154 and is provided with a similar bead structure 168 between the plates 148 and 156.

O-rings 170 and 172 adjacent the plates 146 and 148 provide a seal for the beads 166 and 168 as they are clamped between the respective flanges, as hereinbefore described.

This structure permits the proper support of a very wide curved tire which will fit an entire furrow between rows of cotton plants covering the entire cross section of a furrow which is generally recessed between and below parallel rows of cotton plants.

It will be seen that air or liquid may be admitted into each tire 61*a* through a conventional flexible air inlet valve stem 174 extending through the flanges 148 and 156.

The tire is of such shape that it will completely cover the cross section of a furrow and operate in adjacent relationship to lower limbs and the ground and in very close relationship to cotton plant stalks at opposite sides of the furrow, thus covering adjacent areas of adjacent rows of plants up to and in engagement with the cotton plant stalks.

Each tire 61*a* is provided with peripheral outwardly extending rib portions 176 between which the random fibers 64 are disposed. These ribs 176 provide peripheral bearing surfaces for each tire 61*a* and thereby tend to serve as wear surfaces thereby protecting the random fibers 64 from undue wear. Additionally, these ribs hold the tire upwardly off the soil and permit the engagement of cotton bolls between the ribs on the random fibers 64.

In the operation of the structure, as shown in FIGS. 13, 14, 15 and 16, the passage of the random fibers in contact with the resilient members 116 and 122 may cause electrostatic charging of the random fibers 64 since friction of these resilient members 116 and 122 constantly occurs with relation to the random fibers each time the tire rotates progressively from the conduit 115 to the ground. Thus, the random fibers are assisted in their cotton gathering function.

In the modification of the invention as shown in FIG. 17, a conventional belt 177 may be run over a sheave 178 rotatably mounted on a pin 180 carried by a pivoted arm 182. All of this conventional structure is disclosed in a patent to W. E. Rood (2,670,584), issued Mar. 2, 1954.

Various machines of the prior art comprise wheels, rollers, and belts which are disposed to roll on and make contact with the upper surface of the ground whereon bolls of cotton may have fallen. Accordingly, the random fiber structures disposed on the peripheries of the wheels and rollers, hereinbefore described, may equally well be applied to belts or rigid wheels. Accordingly, as shown in FIG. 17 of the drawings, the random fibers 64, hereinbefore described, are applied to a flexible belt 176 so that the generic invention, in accordance with the present application, may be utilized in connection with either resilient tires which are preferred or the random fibers may be used on a plurality of belts, such as shown in the above mentioned Rood patent, or on any other cotton harvesting apparatus having means contacting the ground for the purpose of gathering cotton lying thereon.

Figures 20, 21, 22, 23:
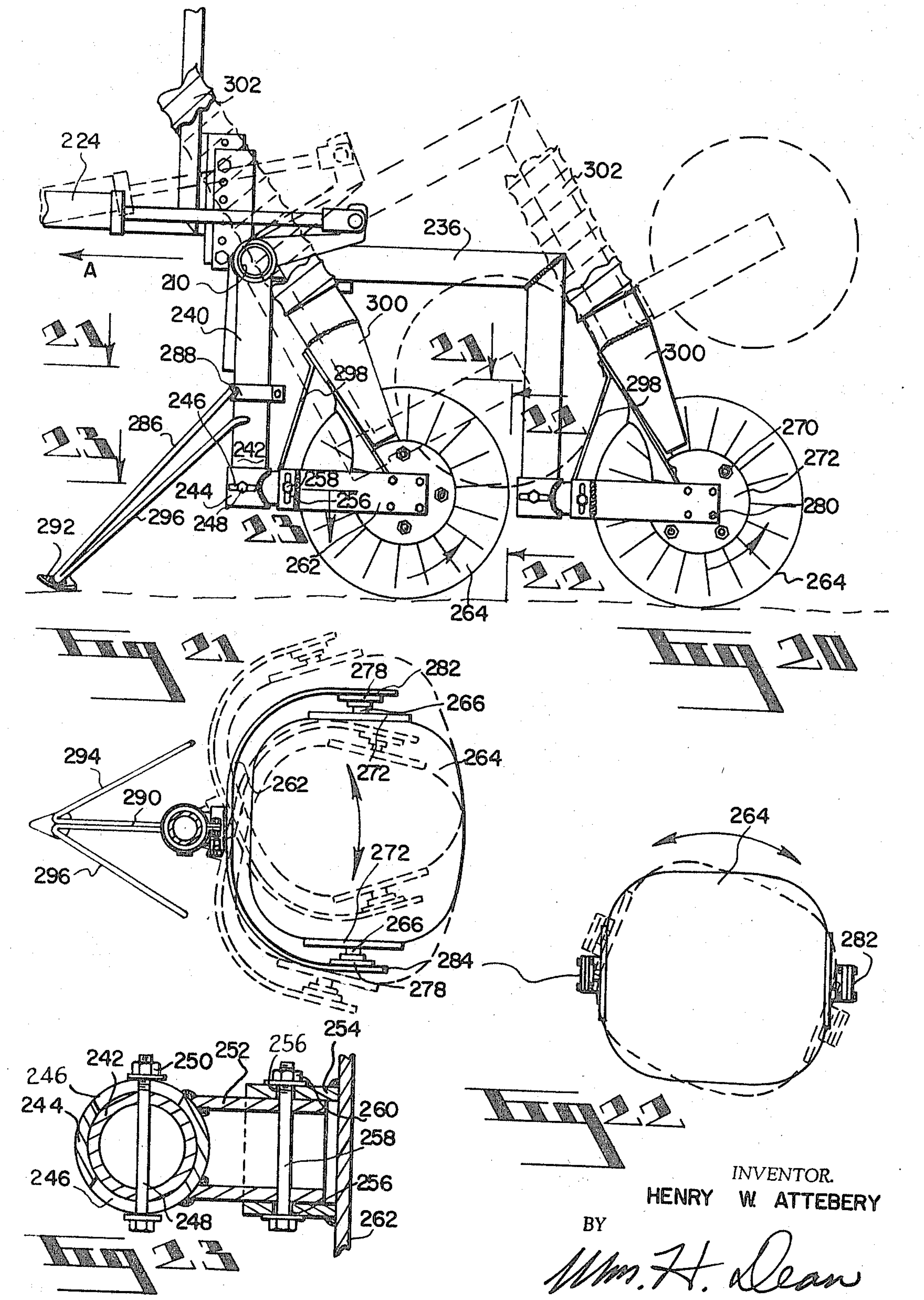
FIGURE 20 is a fragmentary side elevational view of portions of the vehicle taken from the line 20—20 of FIGURE 18 and showing the random coated roller mounting means together with rollers and flexible vacuum conduits for carrying cotton from the rollers.
FIGURE 21 is a fragmentary plan sectional view taken from the line 21—21 of FIGURE 20 showing by broken lines varying positions of a random fiber coated wheel of the invention in pivotal movement thereof about a substantially vertical axis and operating in a caster like fashion.
FIGURE 22 is a rear view of one of the random fiber coated wheels of the invention taken from the line 22—22 of FIGURE 20 and indicating by broken lines varying pivotal movement of the roller about a substantially horizontal axis which may be aligned substantially in the direction of travel of the vehicle and the assembly of rollers shown in FIGURE 20.
FIGURE 23 is an enlarged fragmentary sectional view taken from the line 23—23 of FIGURE 20.

As shown in FIGURES 18 and 20 of the drawings, a vehicle frame 190 provides a support for the cotton harvester of the present invention. This frame 190 may be that of a conventional spindle-type cotton harvesting machine having a source of vacuum and conventional cotton collection basket. Otherwise, the frame 190 may be of any suitable vehicle, as desired, for motivating the random fiber coated rollers of the present invention. The frame 190 may be utilized to tow the mounting means of the invention, as will be hereinafter described, or the mounting means may be disposed to be pushed in front of such a machine frame, if desired.

Projecting from the frame 190 are a pair of plates 192 and 194 which are similar to each other in construction.

Figures 24, 25, 26, 27, 28:
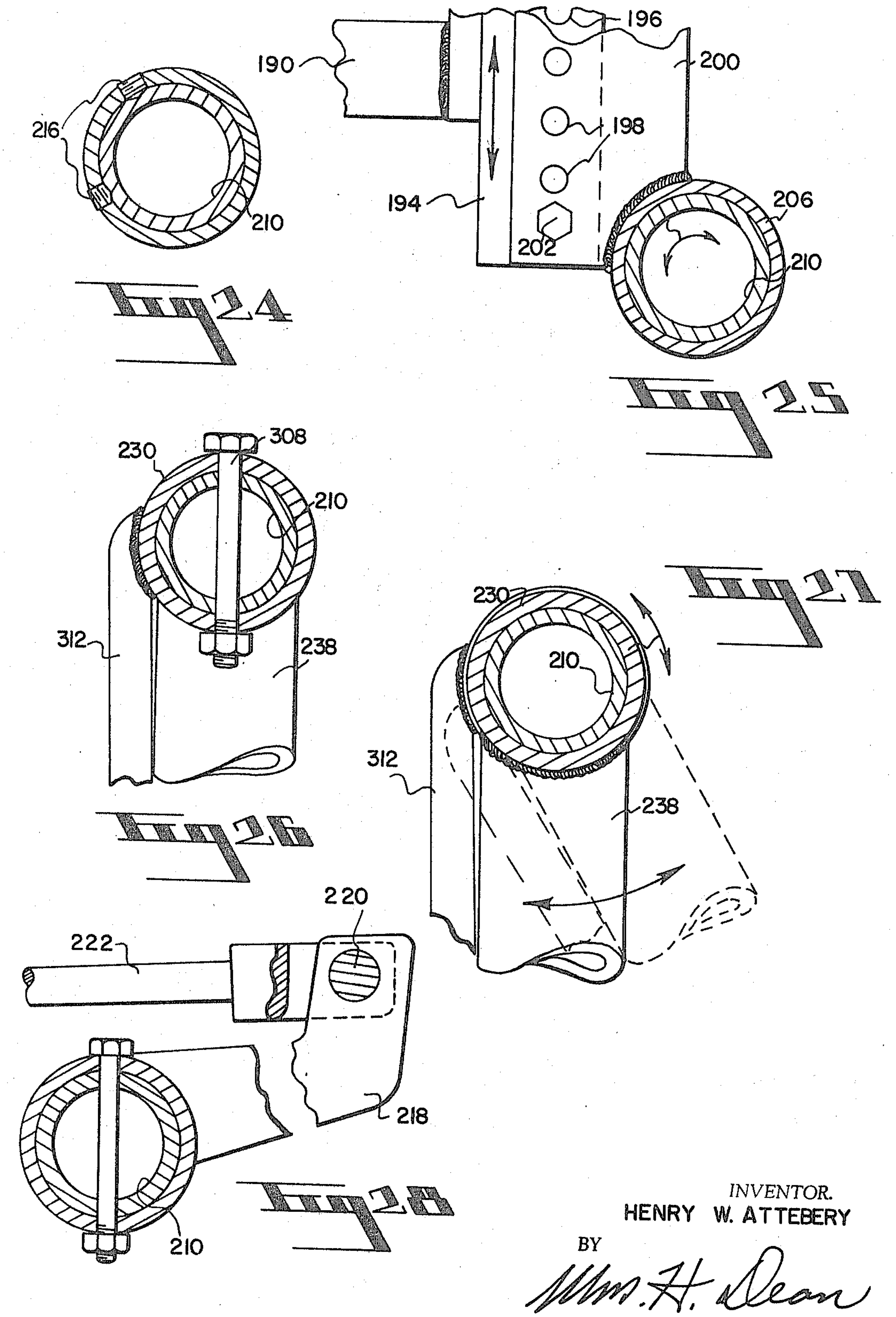
FIGURE 24 is an enlarged fragmentary sectional view taken from the line 24—24 of FIGURE 18.
FIGURE 25 is an enlarged fragmentary sectional view taken from the line 25—25 of FIGURE 18.
FIGURE 26 is an enlarged fragmentary sectional view taken from the line 26—26 of FIGURE 18.
FIGURE 27 is an enlarged fragmentary sectional view taken from the line 27—27 of FIGURE 18 showing by broken lines a varying lift position of caster arms of the random coated mounting means of the invention.
FIGURE 28 is an enlarged fragmentary sectional view taken from the line 28—28 of FIGURE 18.

Reference is made to FIGURE 25 of the drawings wherein the plate 194 is disclosed. This plate 194 is provided with a plurality of openings 196 complemental to openings 198 in a plate 200. Bolts 202 project through the plates in the openings 196 and 198 adjustably to vertically vary the supported relationship of the plate 200 on the plate 194.

A similar arrangement of mechanical connection is provided with respect to the plate 192 and a plate 204, similar to the plate 200 hereinbefore described.

Fixed to the plates 200 and 204 are sleeves 206 and 208 in which a pipe or bar 210 is rotatably mounted. Fixed on the pipe bar 210 are sleeves 212 and 214, respectively, engageable with ends of the sleeves 206 and 208. The sleeves 212 and 214 are fixed by means of setscrews 216, shown in FIGURE 24 of the drawings, to the pipe bar 210 to limit end play thereof in the sleeves 206 and 208.

As shown in FIGURE 28 of the drawings, an arm 218 is fixed to the pipe bar 210 and pivotally connected to the arm 218 by means of a pin 220 is a plunger 222 of an actuating cylinder 224, which is disposed to pivot the pipe bar 210 in the sleeve bearings 206 and 208 to raise or lower the random fiber coated rollers, as will be hereinafter described in detail.

Pivotally mounted on the pipe bar 210 are sleeve bearings 226, 228, 230 and 232. These sleeve bearings 226, 228, 230 and 232 carry struts 234, 236, 238 and 240, respectively, these struts being welded or otherwise secured to the sleeve bearings 226, 228, 230 and 232.

Each of these struts is thus pivotally mounted on horizontal axis of the circular in cross-section pipe bar 210 and each strut is provided with a substantially vertically disposed portion at its lower end. Inasmuch as all of these portions are similar, the end of the strut portion 240, as shown in FIGURE 20 and related figures, will be described herein.

As shown in FIGURES 20 and 23, a lower end portion 242 of the strut 240 supports a sleeve bearing 244 which is pivotal thereon in a substantially vertical axis. In the side of the sleeve bearing 244 a slot 246 extends horizontally and a bolt 248 projects through the sleeve bearing 244 in the elongated slot 246. This bolt 248 extends through the end 242 of the strut 240, and thus, permits the sleeve bearing 244 to be held longitudinally on the end 242 of the strut 240, but also permits the pivotal movement of the sleeve bearing 244 about a vertical axis of the strut 240, thus, the slot 246 traverses the bolt 248 during such vertical axial pivotal movement.

Connected to the sleeve bearing 244 is another pipe section which is circular in cross-section. This pipe section being designated 252. A sleeve bearing 254 is pivotally mounted in the pipe 252 is provided with slots 256, similar to the slots 246 in the sleeve bearing 244. Extending through the slot 256 is a bolt 258 which also extends through the tube section 252, thereby providing a fixture to retain the sleeve bearing longitudinally on the tubular section 252, and permitting pivotal movement of the sleeve bearing 254 about a substantially horizontal axis in a direction as indicated by an arrow A in FIGURE 20 of the drawings, which indicates the direction of movement of the vehicle to which each of these struts are connected.

Secured to the sleeve bearing 254 is a fork 262 in which a random fiber coated roller 264 is rotatably mounted. The random fiber coated roller 264 is preferably a soft pneumatic tire, or a tire which may be filled with liquid, as desired. This tire 264 is similar to that disclosed in FIGURES 12 and 14 of the drawings, also FIGURE 13, however, the cross-sectional shape of this tire is slightly more elongated, but this is a matter of design and shape to meet requirements dealing with the cross section of furrows between cotton plant rows.

The roller 264 is provided with an axle 266 having flanges 268 similar to the flanges 146 and 148, hereinbefore described. Fixed to the flanges 268 are bolts 270, similar to the bolts 158, hereinbefore described. The bolts 270 engage clamp plates 272, similar to the plates 154, hereinbefore described.

The axle 266 being fixed to the plates 268 is provided with oppositely extending portions 274 which are similar. These portions 274 are mounted in anti-friction bearings 276, having mounting flanges 278 through which bolts 280 pass to secure these bearings 278 on the inner sides of the ends 282 and 284 of the fork 262, hereinbefore described.

Secured to each of the vertical struts 234, 236, 238 and 240 is a limb spreading device designated 286 in FIGURE 20 of the drawings. This device 286 is provided with a clamp 288 clamped to the vertical strut 240 and a rod 290 of this limb spreader 286 extends downwardly and forwardly to a runner shoe 292 which is adapted slidably to run along the ground ahead of the roller 264. Secured to the runner 292 and the rod 290 are backwardly diverging bars 294 and 296, which extend backwardly and upwardly from the shoe 292 in order to pick up limbs from a position adjacent to the ground, and to spread them into position so that they will be deflected around the fork 262 and will not be run over by the roller or tire 264.

As shown in FIGURE 20, each of the forks 262 is provided with a bracket 298, which supports a casing 300, which is similar to the casing 115 hereinbefore described.

Connected to this casing 300 is a flexible conduit 302 adapted to conduct cotton to a collector.

It will be seen that the struts 234 and 236 differ in that the strut 236 has a horizontal portion to dispose its vertical strut portion rearwardly of the vertical strut portion of the strut 234. The other vertical struts 238 and 240 are similar and these struts are pivotally mounted on the pipe bar 210 in spaced relation to dispose the rollers 264 in various positions to pick up cotton between rows of cotton plants.

It will be seen from FIGURES 21 and 22 of the drawings that each strut, as hereinbefore described, is pivotally mounted on the pipe bar 210 in a similar manner by means of the respective bearing sleeves, such as the sleeves 226 and 228.

Since this construction is similar, structure of the sleeve 226 will be hereinafter described in connection with mechanism for picking up the struts pivotally around the axis of the pipe bar 210 for raising the rollers or tires to the broken line position, as indicated in FIGURE 20 of the drawings.

At opposite sides of the sleeve bearing 226 are collars 304 and 306 which are fixed to the pipe bar 210 by means of bolts 308, shown in FIGURE 26. These bolts 308 pass through the collars 304 and 306, fixing them against rotation about the axis of the pipe bar 210. Thus when the pipe bar is rotated by means of the actuating cylinder 224, as hereinbefore described, the bolts 308 acting in shear pivot a U-shaped bar 310 which has an intermediate portion 312 directly engageable with the vertical portion of the strut 234. Thus when the pipe bar 210 is rotated by actuation of the power cylinder 224, the random fiber coated rollers 264 may be raised to the broken line positions as shown in FIGURE 20 of the drawings.

It will be understood that the strut 238 may be raised by a bar 312 fixed to collars 314 and 316 in a manner similar to operation of the bar 310 fixed to the collars 304 and 306, as hereinbefore described.

In operation it will be seen that all of the random fiber covered rollers or tires 264 may be raised or lowered by rotation of the bar pipe 210, and that the sleeve bearings 244 and 254 provide for pivotal movement of each roller or tire about a vertical axis and a horizontal axis substantially in line with the direction of travel of the machine, as indicated at A in FIGURE 20 of the drawings. It will further be appreciated that during movement along the ground the rollers when following uneven ground may pivot about the axis of the pipe bar 210, which is substantially parallel with the axis of each roller, thus permitting the rollers to move over uneven ground. Therefore, it will be apparent to those skilled in the art that the rollers or tires 264 may operate in a caster fashion about the vertical axes of the bearing sleeves 244, and they may pivot about a horizontal axes of the bearing sleeves 254, said last mentioned axes of the sleeves 254 being substantially aligned with the direction of the movement of the vehicle to which the rollers 264 are attached. Further, the pivotal movement of the tires or rollers 264 about the horizontal axis of the pipe bar 210 permits these tires to move up and down during their passage over uneven ground. As hereinbefore described, the random fiber coating or covers on the rollers 264 or tires, as the case may be, pick up cotton from the ground and it is vacuumatically collected through the conduits 302 in a similar manner to that described in connection with conduits 118, shown in FIGURE 12.

In the modification of the invention, shown in FIGURES 29, 30 and 31, a pair of random fiber coated rollers 320 and 322 are mounted on shafts 324 and 326 having substantially vertical axes, and these rollers 320 and 322 are supported to run in contiguous relationship to each other, and spring loaded toward each other, and thereby adapted to engage opposite sides of a row of cotton plants for the purpose of picking cotton therefrom by engagement of the random fibers with the mature cotton bolls.

The shafts or axles 324 and 326 are at their opposite ends mounted in forks 328 and 330 in a manner similar to that described in connection with the structure shown in FIGURES 18, 19, 20 and 21.

The forks 328 and 330 are provided with connection structures as shown in FIGURE 23, hereinbefore described. These connection structures comprising the bolts 248 and 258 shown in FIGURE 23 may be tightened to fix the forks 328 and 330 with respect to vertically adjustable arms 332 and 334, shown in FIGURE 29 of the drawings. Thus the bolts 248 and 258, shown in FIGURE 29, may be tightened to cause seizure of the othrwise pivotal connections previously disclosed in FIGURE 23.

The vertically adjustable members 332 and 334 are telescopically mounted in hollow strut members 336 and 338 and are vertically fixed in various positions with respect to the ground 340 by means of pins 342 and 344 which extend through various holes in both the vertically adjustable members 332 and 334 and their respective telescopic members 336 and 338. Thus these vertically adjustable struts support the rollers 320 and 322 to rotate about the vertical axes of the shafts or axles 324 and 326 respectively.

The strut 336 is pivoted on a horizontal axis extending through a bolt 346 mounted in a frame cross member 348. Likewise the strut 338 is pivotally mounted on a horizontal axis by means of a bolt 350 extending through the frame member 348. An adjustable spring 352, by means of turn buckles 354 and 356 is adjustably tensioned and connected to and between the struts 336 and 338, tending to force them together and to hold the peripheries of the rollers or tires 320 and 322 in compressive engagement with each other. The struts 336 and 338 are, however, movable apart by obstructions which may be passed between the rollers or tires 320 and 322, all as indicated by broken lines in FIGURE 29 of the drawings. Further, it will be appreciated that the struts 336 and 338 may both pivot laterally in the same direction in the event the cotton harvester to which the frame member 348 is connected may not be operated in exact alignment with a row of cotton stalks or plants 354.

The frame member 348 is connected with angular brace members 356 and 358 coupled to a common clevis 360 pivotally mounted in connection with a vehicle frame 362 by a vertical axis pin 364.

It will be seen that the members 356 and 356 are coupled to the clevis 360 by means of a pair of bars 370 through which a pin 372 projects. This pin 372 also projects through a stationary upstanding structure 374 integral with the clevis 360. Thus the frame member 348 is pivoted on a horizontal axis in connection with the clevis 360 and capable of being elevated by force of a hydraulic cylinder 376, all as shown best in FIGURES 30 and 31 of the drawings. A plunger 378 of the hydraulic cylinder is pivotally coupled by a pin 380 to the frame member 348, and likewise the cylinder member of he hydraulic cylinder 376 is coupled pivotally to the clevis 360 by a pin 382. Thus when the hydraulic cylinder 376 is energized to retract its plunger 378 it causes pivotal movement of the frame member 348 and the rollers 320 and 322 upwardly about a horizontal axis of the pin 372.

Below the members 356 and 358 in connection with the frame member 348 are braces 384 which support brackets 386 carrying cotton collector housings 388 similar to the housings 300, hereinbefore described.

It will be appreciated that the vertically adjustable members 332 and 334 in the telescopic struts 336 and 338 permit the rollers 320 and 322 to assume broken line positions 321 and 323 respectively, as indicated in FIGURE 29 of the drawings. In the broken line positions the rollers, with their random fiber coated surfaces, may be used at opposite sides of a row of cotton plants near the ground for picking cotton which matures early and is normally harvested during the first picking. As the cotton matures further, and later in the season, the rollers 320 and 322 may be moved upwardly by the vertically adjustable members 332 and 334, and may be fixed in such upper position compatable with the progressive maturity of the cotton from the early part of the season to the later part of the season.

Thus, during successive pickings, the rollers may be elevated progressively and the rollers being spring loaded together, and being very soft and resilient, readily roll on opposite sides of cotton plants to harvest the cotton therefrom. The pivotal mounting of the struts 336 and 338 readily permits slight misalignment of the cotton harvester vehicle having a frame 362. Thus, this misalignment with the cotton rows 354 is compensated for by a lateral shifting movement of the struts 336 and 338 so that the cotton plants themselves may induce the rollers 320 and 322 precisely to follow plants even though the machine frame 362 is not exactly aligned with the row of plants 354. Additionally, pivotal mounting of the frame member 348 about a vertical pivotal axis of the pin or bolt 364 permits lateral automatic adjustment of the rollers 320 and 322 to compressively engage cotton plants between them, and to maintain alignment with the row of plants.

The hydraulic cylinder 376, when energized, pivots the entire frame 348 upwardly or downwardly with respect to the frame 362 so that rollers 320 and 322 may be picked up to a position well above the surface of the ground during movement of the cotton harvester from one row to another during cotton harvesting operations or during any other transport of the structure shown in FIGURES 29 to 31, inclusive.

In FIGURE 32 adjacent portions of the rollers 320 and 322 are disclosed. The rollers or tires 320 and 322 are provided with soft flexible pneumatic tire portions 390 and 392, respectively. On the outer sides of these tires are soft compressible layers of material designated 394 and 396 respectively. These layers may be sponge rubber or any other suitable material capable of readily deflecting around bolls of cotton in order to prevent damage to green bolls and to cause separation of the mature cotton from mature dry hulls thereof.

On the outer surface of the soft flexible layers 394 and 396 and on the perimeter of the rollers or tires 320 and 322 are random fiber coatings 398 and 400 respectively. These random fibers, as hereinbefore described, may be of any fibrous material, and the fibers are disposed in different directions and in a random pattern in order sufficiently to impale mature bolls of cotton and these fibers are sufficiently flexible so that they do not penetrate leaves, blades of grass, sticks, or other trash, and thereby fully discriminate in harvesting high grade cotton and rejecting foreign matter.

The tires when in operation, as indicated in FIGURE 32, due to their compressive layers 394 and 396, efficiently crank portions 402 from the hull of a mature cotton boll causing these portions 402 to fall to the ground during initial contact of the rollers on opposite sides of the boll, and consequently causing the random fibers 398 and 400 to retain the soft cotton designated 404 in FIGURE 32 to be carried under suction hoods when the cotton tufts are removed and carried to the basket.

In the modification of the invention, as shown in FIGURES 33, 34 and 35, a cotton harvester vehicle frame 406 may be supported by wheels and power driven. This frame 406 carries vertical tracks 408 having rollers 410 vertically movable therein. These rollers 410 are mounted on a picker frame 412, the upper portion of which is pivotally mounted on pins 414 by means of arms 416 pivotally connected by pins 418 to shield portions 420 of the picker frame.

The arms 416 are fixed to arms 422 forming bell crank structures to which a plunger 424 of a hydraulic cylinder is pivotally connected by a pin 426. The hydraulic cylinder 428 is pivotally anchored to the frame 406 by a pin 430. Thus, when the hydraulic cylinder 428 is energized to retract its plunger 424 the arms 416 are pivoted upwardly around the axis of the pins 414 to move the shields 420 to a broken line position 432, all as shown best in FIGURE 33 of the drawings.

Carried by the picker frame 412 is a pair of substantially identical shields 420 which are opposite hand, and are provided with backwardly diverging portions resulting in a converging space between the two shields 420 at their forward ends 434. These forward ends 434 are sufficiently far apart to engage outwardly extending limbs of cotton plants and to force them together into a position in alignment with a pair of vertical axis rollers 436 and 438 which are similar to the rollers 320 and 322, hereinbefore described. The rollers 436 and 438 are vertically adjustably mounted on shafts 440 and 442 carried by bearings 444 and 446 mounted on the frame 412. As shown in FIGURE 36 of the drawings, there are a pair of the bearings 444 and a pair of the bearings 446 vertically spaced longitudinally of the respective shafts 440 and 442 in order to support these shafts in vertical axial cantilevered position. The rollers 436 and 438 are vertically adjustably movable on the shafts 440 and 442 to adjust the vertical position of these rollers with respect to the surface of the ground and with respect to the elevation of the mature cotton, which matures progressively from the ground up during the harvesting season.

The rollers or tires 436 and 438 are provided with hubs having pins 448 and 450, respectively, said pins extending through the shafts 440 and 442 and being positionable in various openings through the shafts at various vertical elevations to support the rollers 436 and 438 in various elevated positions and also to drive them or hold the rollers on the shaft, as desired. Thus the rollers 436 and 438 may be held on the shafts in either of the solid line positions or broken line positions illustrated in FIGURE 36.

Fixed to the lower ends of the shafts 440 and 446 are spider assemblies 452 and 454. These spider assemblies 452 and 454 are provided with alternate substantially rigid fingers 456 and relatively flexible fingers 458. The substantially rigid radially extending fingers 456 engage between stalks of cotton resignated 354, and thus rotate the shafts 440 and 446 to cause conforming rotation of the rollers 436 and 438 at opposite sides of the cotton plants 354.

While the rigid fingers 456 thus rotatably drive the shafts 440 and 442 and the respective rollers 436 and 438, the flexible fingers 558 which are covered with random fibers pick mature bolls of cotton from positions between and around the stalks 354 and from the surface of the ground and transfer these soft bolls of cotton into positions between the rows of stalks 354 so that the rollers 264 or other equivalent rollers disclosed herein may retrieve the cotton from the ground.

As the modified structure shown in FIGURES 33, 34, 35 and 36 moves along the ground the rollers 410 move upwardly and downwardly in the tracks 408, and the links 416 pivot about the axes of the pins 414 independently of the arms 422 which are provided with stirrups 423 disposed to engage the underside of the links 414 when the hydraulic cylinder plunger 424 is retracted. Otherwise the structure of the arms 416 is freely pivotal upwardly above the portions 423 as the mechanism passes over uneven ground and when an obstruction tends to raise the frame 412 together with the respective cotton picking rollers and shields.

In the modification as shown in FIGURE 31 a pair of shafts 560 and 562 each support a pair of rollers similar to the rollers 420, 422, 436 and 438. The shaft 560 thus supports a pair of rollers 564 and the shaft 562 supports a pair of rollers 566. These are random fiber coated rollers similar to those hereinbefore described. These shafts 560 and 562 are mounted in bearings at the upper and lower ends thereof, supported on cross members 568 and 570 of the frame 412.

The rollers 564 and 566 are disposed in closely engaged relationship at their peripheries and are adapted to be plant driven, that is to say, the axes of the shafts 560 and 562 are substantially vertically disposed and as the frame carrying these shafts is moved longitudinally of a row of cotton plants 354, the rollers 564 and 566 will roll on opposite sides of the plants and may not require any power for driving the shafts 560 and 562. Further the plant driven rollers 564 and 566 are, thus, perfectly coordinated with the rolling movement at their peripheries over the limbs and cotton bolls on the plants.

As shown in FIGURE 39 a complete structure of the rollers 320 and 322 is disclosed. The roller 320, for example, is provided with the pneumatic tire 390 having a soft layer 394, as shown in FIGURE 32. Outwardly of this layer 394 is another layer 395 carrying the random fibers 398. Opposite ends of the tire are held by clamp plates 269 and 272, as hereinbefore described in connection with FIGURE 39 and other figures previously described.

A modification of this tire or roller 320 as shown in FIGURE 40 wherein the clamping flanges 268 and 272 are relatively close together providing annular lobes 570 and 572 at opposite axial ends of the tire. These annular lobes are deflectable into a broken line position 574 as they are disposed and rolled against the ground adjacent to rows of cotton plant stalks 354. Thus, an intimate engagement of the random fiber surfaces of the various tires and rollers of the invention may be attained in very close proximity to the ground without interference of the flange plates 268 and 272 or the respective shaft, and thus, none of these structures touch the ground while the annular lobe 574 is readily compressible and deflectable into intimate engagement with the surface of the ground and the plant stalks at their emergence therefrom.

FIGURE 41 discloses an enlarged cross-section of the annular lobe 574 shown in FIGURE 40, but including the cross-sectional structure disclosed in FIGURE 39 wherein a soft compressible layer 576 is disposed between the random fiber supporting layer 578 and the pneumatic tire structure 580, these structures corresponding with the construction of the tire disclosed in FIGURE 39.

In the modification shown in FIGURE 42, the annular tire lobe 574 is provided with projecting fingers 582 which are covered with random fibers in accordance with the teaching of the invention and as hereinbefore described.

It will be obvious to those skilled in the art that these fingers 582 may be disposed on the outer sides of any one of the tires or rollers hereinbefore described and that the fingers, having random fibers, may reach in between limbs and other structures of the cotton plants to engage and retract cotton therefrom so that as the tires are operated in opposed relaionship to each other as indicated in FIGURES 29 and 30 that the tires 320 and 322, for example, may be provided with these fingers 582, which will overlap and reach in between the limbs of the cotton plants. Furthermore, when the tires or rollers are operated on vertical axes and in peripherally spaced relation to each other as taught in FIGURE 8 of the drawings, the fingers 582 may reach between the rollers one to the other and intimately pass between the limbs of cotton plants and around them, and may thereby pick mature cotton and straddle green bolls without damaging or removing them from the plants, thus leaving the green bolls to mature and be harvested at a later date.

It will be obvious to those skilled in the art that various modifications of the present invention may be resorted to in a manner limited only by a just interpretation of the following claims.

I claim:

1. In a cotton harvester the combination of: a soft deflectable roller adapted to deflect and conform to the surface of the ground and having a plurality of fibers at the periphery thereof; means rotatably supporting said roller to contact the earth and roll thereon; and vacuum conduit means disposed to remove cotton from said fibers when they roll to a position above the ground.

2. In a cotton harvester the combination of: a roller having a plurality of random fibers at the periphery thereof; means rotatably supporting said roller to contact the earth and roll thereon; and vacuum conduit means disposed to remove cotton from said random fibers when they roll to a position above the ground; a casing disposed adjacent the periphery of said roller and adapted to contain a partial vacuum therein; said casing having a roller periphery escape side and a roller periphery approach side and having means disposed to extend around a substantial peripheral portion of said roller; a flap of resilient material adjacent the periphery of said roller and extending toward the direction of rotation of said roller at the roller periphery escape side of said casing; a second flap adjacent the roller periphery approach side of said casing and extending toward the direction of rotation adjacent the periphery of said roller; said casing provided with clearance at the roller periphery approach side for cotton carried on the surface of said roller to pass into said casing; whereby vacuum in said casing tends to force said flap at the roller periphery escape side of said casing into close contact and into partial sealing relation with the periphery of said roller and said vacuum tends to force said flap at said roller periphery approach side slightly away from said fibers so that cotton carried thereon may pass into the interior of said casing at said roller periphery approach side and may then be removed and carried from said fibers by vacuum flow approaching through said roller periphery approach side and from said casing to a point of collection.

3. In a cotton harvester the combination of: a soft deflectable roller adapted to deflect and conform to the surface of the ground and having a plurality of random fibers at the periphery thereof; means rotatably supporting said roller to contact the earth and roll thereon; and vacuum conduit means disposed to remove cotton from said random fibers when they roll to a position above the ground; said roller being adapted to follow a conventional cotton picking machine and to roll upon the surface of the ground for picking up cotton knocked to the ground by the machine.

4. In a cotton harvester the combination of: a soft deflectable roller adapted to deflect and conform to the surface of the ground and having a plurality of random fibers at the periphery thereof; means rotatably supporting said roller to contact the earth and roll thereon; and vacuum conduit means disposed to remove cotton from said random fibers when they roll to a position above the ground; said roller being adapted to roll on the ground ahead of a conventional cotton picking machine to pick up cotton from the ground.

5. In a cotton harvester the combination of: a soft deflectable roller adapted to deflect and conform to the surface of the ground and having a plurality of fibers at the periphery thereof; means rotatably supporting said roller to contact the earth and roll thereon; and vacuum conduit means disposed to remove cotton from said fibers when they roll to a position above the ground; said roller being of soft resilient and deflectable structure and having said fibers secured thereto and directed outwardly from periphery whereby said fibers impale soft cotton and hold soft cotton thereto; and means for vacuumatically removing said soft cotton from said fibers.

6. In a cotton harvester the combination of: a soft deflectable roller and adapted to deflect and conform with the surface of the ground and having a plurality of cotton impaling elements on the periphery thereof; means rotatably supporting said roller to contact the earth and roll thereon; and vacuum conduit means disposed to remove cotton from said cotton impaling elements when they roll to a position above the ground; said roller being adapted to roll upon the surface of the ground for picking up cotton; spaced soil engaging bearing surface portions extending outwardly from the periphery of said roller between which said cotton impaling elements are disposed, whereby said bearing surface portions resist wear of said cotton impaling elements around the periphery of said roller.

7. In a cotton harvester the combination of: a roller having a plurality of random fibers at the periphery thereof; means rotatably supporting said roller to contact the earth and roll thereon; and vacuum conduit means disposed to remove cotton from said random fibers when they roll to a position above the ground; said roller being adapted to follow a conventional cotton picking machine and to roll upon the surface of the ground for picking up cotton knocked to the ground by the machine; said roller comprising a resilient tire having said random fibers thereon; a shaft extending through said tire; fixed flanges disposed in spaced relation on said shaft; second flanges outwardly of said first mentioned flanges; means clamping said second flanges to said first flanges; said tire having beads disposed between said first and second flanges and clamped therebetween for sealing fluid internally of said tire; means rotatably supporting said shaft to permit said roller to roll on the surface of the ground.

8. In a cotton harvester the combination of: soft deflectable means adapted to deflect and conform with the surface of the ground and disposed to traverse the ground; random fibers on said means disposed to contact the ground as said means traverses the upper surface thereof; and means disposed to collect cotton from said first means as it moves away from said ground.

9. In a cotton harvester, the combination of: soft deflectable means adapted to deflect and conform with the surface of the ground and disposed to roll on the ground; a plurality of random fibers on a portion of said means in contact with the ground; and means for removing cotton from said random fibers as they roll away from the surface of the ground.

10. In a cotton harvester the combination of: a roller having a plurality of fibers at the periphery thereof; means rotatably supporting said roller to contact the earth and roll thereon; and vacuum conduit means disposed to remove cotton from said fibers when they roll to a position above the ground; a casing disposed adjacent to the periphery of said roller and adapted to contain a vacuum therein; said casing having a roller periphery escape side and a roller periphery approach side and having means disposed to extend around a substantial peripheral portion of said roller; a flap of resilient material adjacent the periphery of said roller and extending toward the direction of rotation of said roller at the roller periphery escape side thereof; said casing provided with clearance at the roller periphery approach side for cotton carried on the surface of said roller to pass into said casing whereby vacuum in said casing tends to force said flap at the roller periphery escape side of said casing into close contact with the periphery of said roller so that the cotton carried thereon may pass into the interior of said casing and may then be carried by vacuum flow from said casing to a point of collection.

11. In a cotton harvester for picking up cotton from the ground the combination of: a soft deflectable roller adapted to roll on the surface of the ground between rows of cotton plants and substantially to deflect and conform with the surface of the ground; cotton impaling pick up elements on the periphery of said roller; and bearing surface portions on the periphery of said roller and extending outwardly therefrom, said cotton impaling pick up elements disposed between said bearing surface portions whereby said bearing surface portions tend to serve as wearing surfaces to thereby hold the periphery of said roller upwardly relative to the soil and to thereby protect the cotton impaling elements from undue wear and to permit said cotton impaling elements to engage cotton between said bearing surface portions.

References Cited

UNITED STATES PATENTS

| | | | |
|---|---|---|---|
| 648,527 | 5/1900 | Richards | 15—179 |
| 1,590,174 | 6/1926 | Hall | 56—48 |
| 1,763,607 | 6/1930 | Watskins | 56—48 |
| 1,836,128 | 12/1931 | Palmer | 56—14 |
| 2,542,871 | 2/1951 | Johnson | 56—28 X |
| 2,896,398 | 7/1959 | Green | 56—48 |
| 2,928,224 | 3/1960 | Powell | 56—28 |
| 2,938,321 | 5/1960 | Tieman | 56—12 |
| 3,040,505 | 6/1962 | De Tuncq et al. | 56—28 |
| 3,100,368 | 8/1963 | Logan | 56—12 |

ABRAHAM G. STONE, *Primary Examiner.*

RUSSELL R. KINSEY, *Examiner.*